United States Patent [19]

Kerbyson

[11] Patent Number: 5,790,183
[45] Date of Patent: Aug. 4, 1998

[54] HIGH-RESOLUTION PANORAMIC TELEVISION SURVEILLANCE SYSTEM WITH SYNOPTIC WIDE-ANGLE FIELD OF VIEW

[76] Inventor: Gerald M. Kerbyson, 105 Vineyard Ct., Los Gatos, Calif. 95030

[21] Appl. No.: 628,498

[22] Filed: Apr. 5, 1996

[51] Int. Cl.$^6$ .................................................. H04N 7/18
[52] U.S. Cl. ............................ 348/37; 174/86; 439/13
[58] Field of Search ............................ 348/36, 37, 38, 348/39; 174/86; 439/13; H04N 7/18

[56] References Cited

U.S. PATENT DOCUMENTS

| Re. 29,738 | 8/1978 | Adams | 359/503 |
|---|---|---|---|
| 3,505,465 | 4/1970 | Rees | 348/36 |
| 4,355,328 | 10/1982 | Kulik | 348/38 |
| 4,532,544 | 7/1985 | Federau | 348/37 |
| 4,613,898 | 9/1986 | Bagnall-Wild et al. | 348/39 |
| 4,626,905 | 12/1986 | Schmidt | 348/36 |
| 4,672,435 | 6/1987 | Gluck | 348/44 |
| 4,772,942 | 9/1988 | Tuck | 348/38 |
| 4,982,092 | 1/1991 | Jehle | 250/332 |
| 5,097,325 | 3/1992 | Dill | 348/37 |
| 5,130,794 | 7/1992 | Ritchey | 348/39 |
| 5,262,852 | 11/1993 | Eouzan et al. | 348/39 |

OTHER PUBLICATIONS

Brochure Published by SPAR Aerospace, LTD. "AN/SAR-8", 5 pages. Date of Publication Unknown, but Known to be Before 1991.

Brochure Published by TRI, Inc., "Omniview, The Virtual Eye", 2 pages. Believed to be Published in 1995.

Brochure Published by SAT and CSEE in 1989, "VAMPIR ML11" (6 pages).

Article by Rife and Balian, "Shipboard Infra-Red Surveillance and Target Designation System", Proc. IRIS vol. 25, No. 1, 1980, pp. 213 through 221.

Primary Examiner—Bryan S. Tung

[57] ABSTRACT

A panoramic television surveillance system includes an image-sensing station having an imaging sensor with a line-format field of view mounted on a platform rotatable about an azimuthal scan-rotational axis. The imaging sensor collects a "live" television-like panoramic synoptic surveillance image of the full panoramic wide-angle field. The image data is delivered by an image-data-delivery line, which incorporates a rotary-joint data link, to an image-monitoring station. The image-monitoring station includes an image-data-processor, display-buffer-storage, and a synoptic panoramic wide-angle array of visual monitor displays to permit continuous synoptic evaluation of the full panoramic scene, up to 360° wide, at an observer-personnel position. Alternatively, the image-monitoring station includes the image-data processor and an image-data recorder for continuous recording of the image data for off-line evaluation.

29 Claims, 14 Drawing Sheets

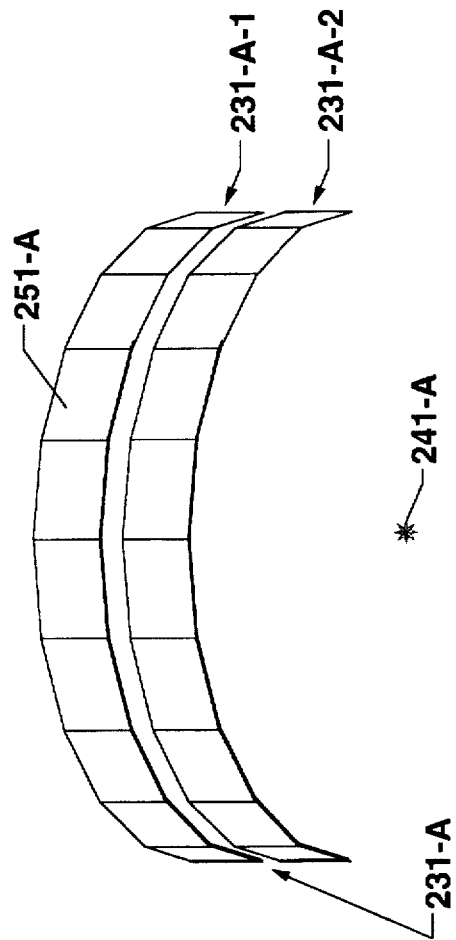
FIG. 7-B
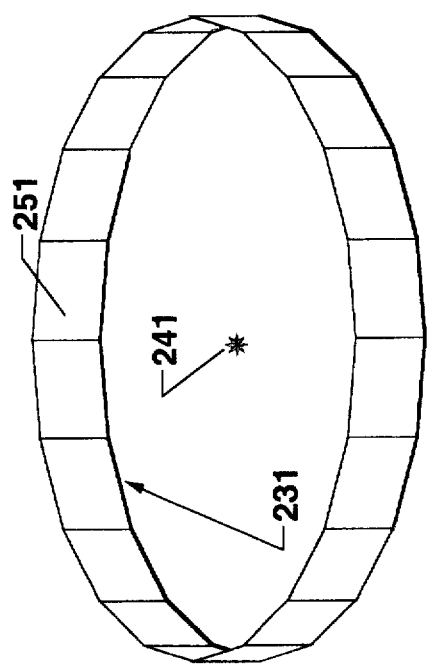
FIG. 7-A

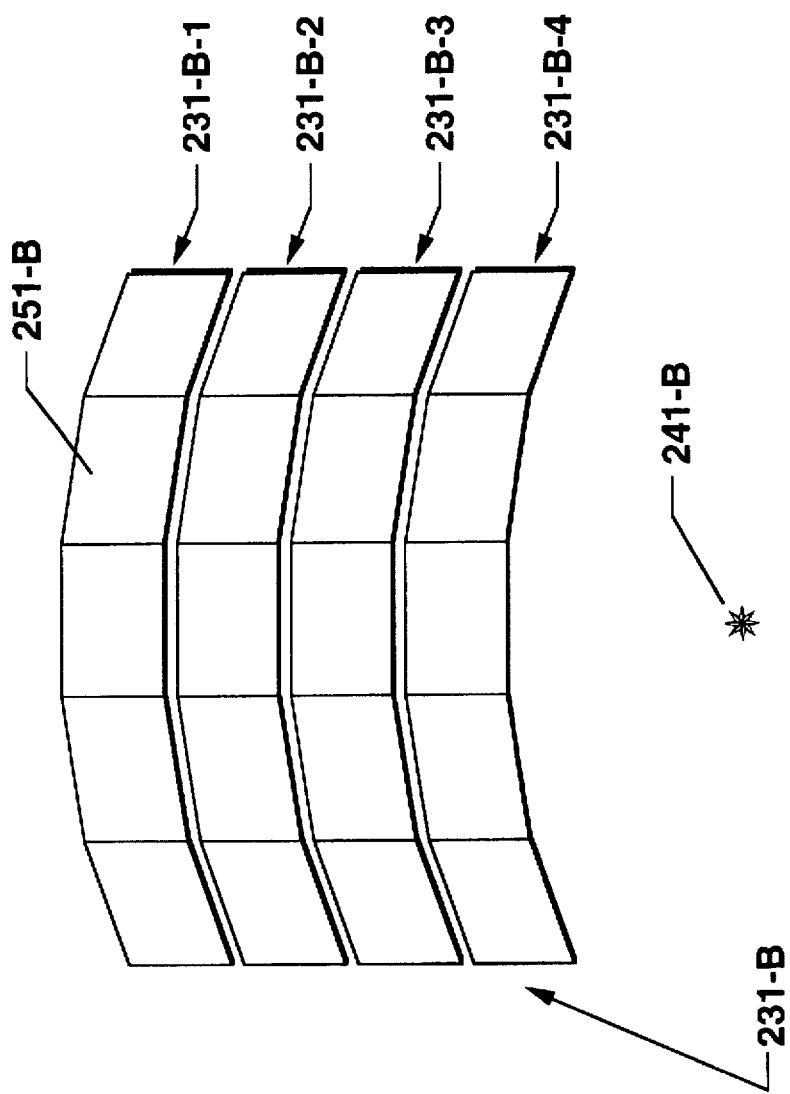
FIG. 7-C

HIGH-RESOLUTION PANORAMIC TELEVISION SURVEILLANCE SYSTEM WITH SYNOPTIC WIDE-ANGLE FIELD OF VIEW

BACKGROUND

1. Field of Invention

This invention relates to panoramic television systems, as commonly employed in surveillance applications for the purpose of prompt detection, location, and monitoring of objects, or targets, of interest within the area surrounding a location or a vehicle.

2. Description of Prior Art

The present invention addresses the field of real-time panoramic wide-angle high-resolution imaging surveillance applications. This field includes systems for the following illustrative applications categories:

1. Immediate detection and monitoring of unauthorized personnel or activities within a building or an outdoor facility area; and 2. Continuous self-defense surveillance from a vehicle (aircraft, ground vehicle, ship, or submarine) against the possibility of collision, or attack, from any direction.

The primary requirements for effective performance in this field of applications are summarized in the following five fundamental criteria:

1. Continuous collection of the full wide-angle field-of-view (FOV) panoramic synoptic image, typically a full-circle 360° field, of the surrounding scene.

The term "synoptic" is taken here to pertain to a spatially uninterrupted image, or a time sequence of such images, of a large area wherein each said image of the entire area is effectively collected at a single instant in time.

2. High spatial resolution in the collected input image, and equally high spatial resolution in the displayed output image, throughout the entire panoramic FOV. The term "high spatial resolution" is taken here to refer to images with a total spatial resolution of the order of 1,000 picture elements in a relatively narrow-field, e.g., elevation, dimension and 20,000 picture elements in the wider-field, panoramic, dimension resulting in a nominal total of 20,000,000 picture elements to represent the full panoramic scene. In addition, the term "high spatial resolution" is taken here to refer to images in which the spatial resolution is isotropic, or approximately equal in the two orthogonal dimensions of the image.

3. Real-time evaluation of the continuously collected image data alternatively by:

a) manual means, i.e., direct synoptic display of an effectively "live" television-like surveillance image to observer personnel, or by b) semi-automatic means, i.e., by real-time image-data-processing to provide automatic evaluation of the scene image data and to alert and display to the observer personnel only at times when scene content of potential interest has been automatically detected.

The term, "live" television-like, is taken here to refer to a panoramic scene scanning, and display, cycle interval sufficiently short to capture all significant motions and changes that occur within the panoramic scene view.

Typical cycle intervals in the present surveillance context are of the order of one second, ranging from less than one tenth of one second to tens of seconds.

A special alternative category of surveillance systems does not employ real-time evaluation. For this category, real-time recording is employed, capturing the space-time relationships in effect at the time of image collection, but deferring evaluation to a later time, and in some instances, at another location.

4. Avoiding the necessity of employing exotic or exorbitantly costly elements. This issue is particularly critical in applications requiring very-high-quality imaging performance, such as very high spatial resolution and thermal-infrared sensing.

5. Providing the superior combined features listed above while employing only a single imaging sensor and preserving a data rate comparable to a narrow-FOV type system employing a single conventional TV-type imaging sensor, without incurring the exorbitant costs associated with the conventional alternative solution involving a large number of conventional TV-type imaging sensors and the attendant immense data rate.

All known prior art in the field of real-time high-resolution panoramic imaging surveillance systems has failed to meet the totality of these fundamental criteria. Every instance of the prior art has failed to meet at least one of the five fundamental requirements cited above.

OBJECTS AND SUMMARY OF INVENTION

It is an object of the present invention to provide a system having significantly superior television surveillance performance, as compared to that of the prior art, by eliminating the causes of their disadvantages as cited above. The present invention uniquely provides the combination of very high spatial resolution and full wide-angle panoramic synoptic real-time surveillance monitoring, and satisfies all five of the performance criteria discussed in the preceding section.

An important object of my invention is to provide a form of imaging surveillance system which overcomes the limitations of the prior art in terms of economically practical continuous real-time panoramic high-resolution synoptic imaging surveillance, readily accommodating surveillance evaluation by either the manual mode, or the semi-automated mode, as defined above, for a wide variety of important applications including the following illustrative example categories:

1. Immediate detection and monitoring of unauthorized personnel or activities within a building or an outdoor facility area; and 2. Continuous self-defense surveillance from a vehicle (aircraft, ground vehicle, ship, or submarine) against the possibility of collision, or attack, from any direction.

My invention is a panoramic television surveillance system which includes an image-sensing station having an imaging sensor with a line-format field of view mounted on a platform rotatable about an azimuthal scan-rotational axis. The imaging sensor collects a "live" television-like panoramic synoptic surveillance image of the full panoramic wide-angle field. The image data is delivered by an image-data-delivery line, which incorporates a rotary-joint data link. Preferably, the image data is transmitted to an image-monitoring station including an image-data-processor, display-buffer-storage, and a synoptic panoramic wide-angle array of visual monitor displays to enable continuous synoptic evaluation of the full panoramic scene, up to 360° wide, at an observer-personnel position. Alternatively, the image-monitoring station includes the image-data processor and an image-data recorder for continuous recording of the image data for off-line evaluation.

The unique performance combination of very high spatial resolution and "live" television-like synoptic wide-angle panoramic surveillance imaging and display which the present invention provides is effected with a single line-format imaging sensor with a data rate only modestly greater than that of an individual conventional television camera. Such a data rate is drastically lower, and the system drastically less expensive, than would be the case for an alternative system providing equal resolution and field of view, but employing an array of conventional narrow-field television-type (i.e., staring-mode) imaging devices. The associated economy is available through a recognition of the fact that for a major sector of surveillance applications, the imaging frame rate ordinarily employed, using the conventional type of closed-circuit television-type (staring-mode) imaging sensors, typically 30 hertz, is much higher than needed. Rather, for this class of imaging surveillance applications, an imaging frame rate of the order of 1 hertz is typically adequate. As a result, the imaging frame rate for a full panoramic high-resolution system according to the present invention is typically only a few times that of a single narrow-field imaging sensor of the conventional type.

Further objects and advantages of my invention will become apparent from a consideration of the drawings and ensuing description.

BRIEF DESCRIPTION OF THE DRAWINGS

Four embodiments of the present invention will now be described with reference to the accompanying drawings in which:

FIG. 7, comprising FIGS. 7-A, 7-B, and 7-C, shows alternative arrangements for the synoptic panoramic wide-angle array of monitor-displays to provide a full panoramic image for the system shown in FIG. 1.

DESCRIPTION OF PREFERRED EMBODIMENTS

Figure 1:
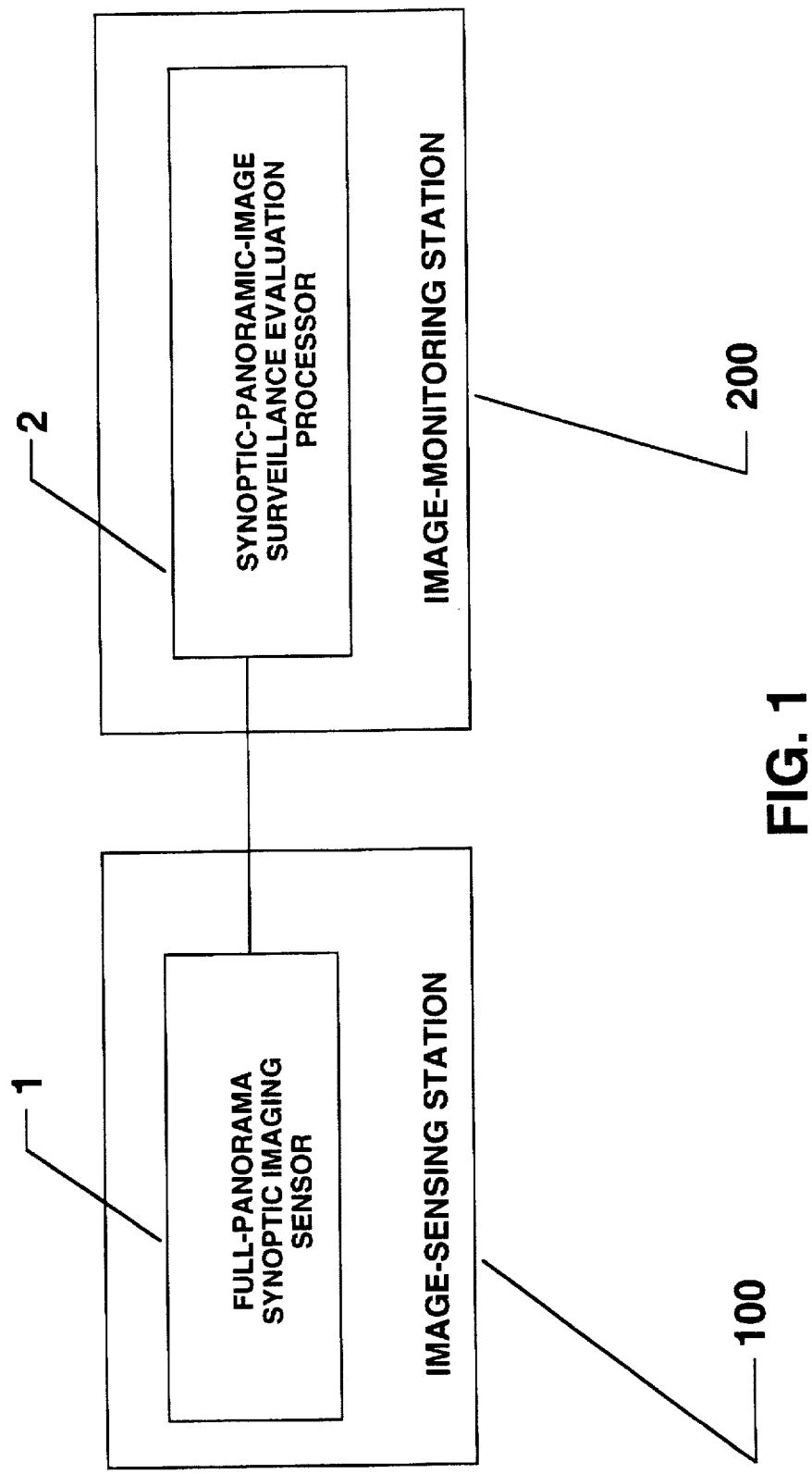
FIG. 1 illustrates the top-level system concept according to the present invention.
Figure 2:
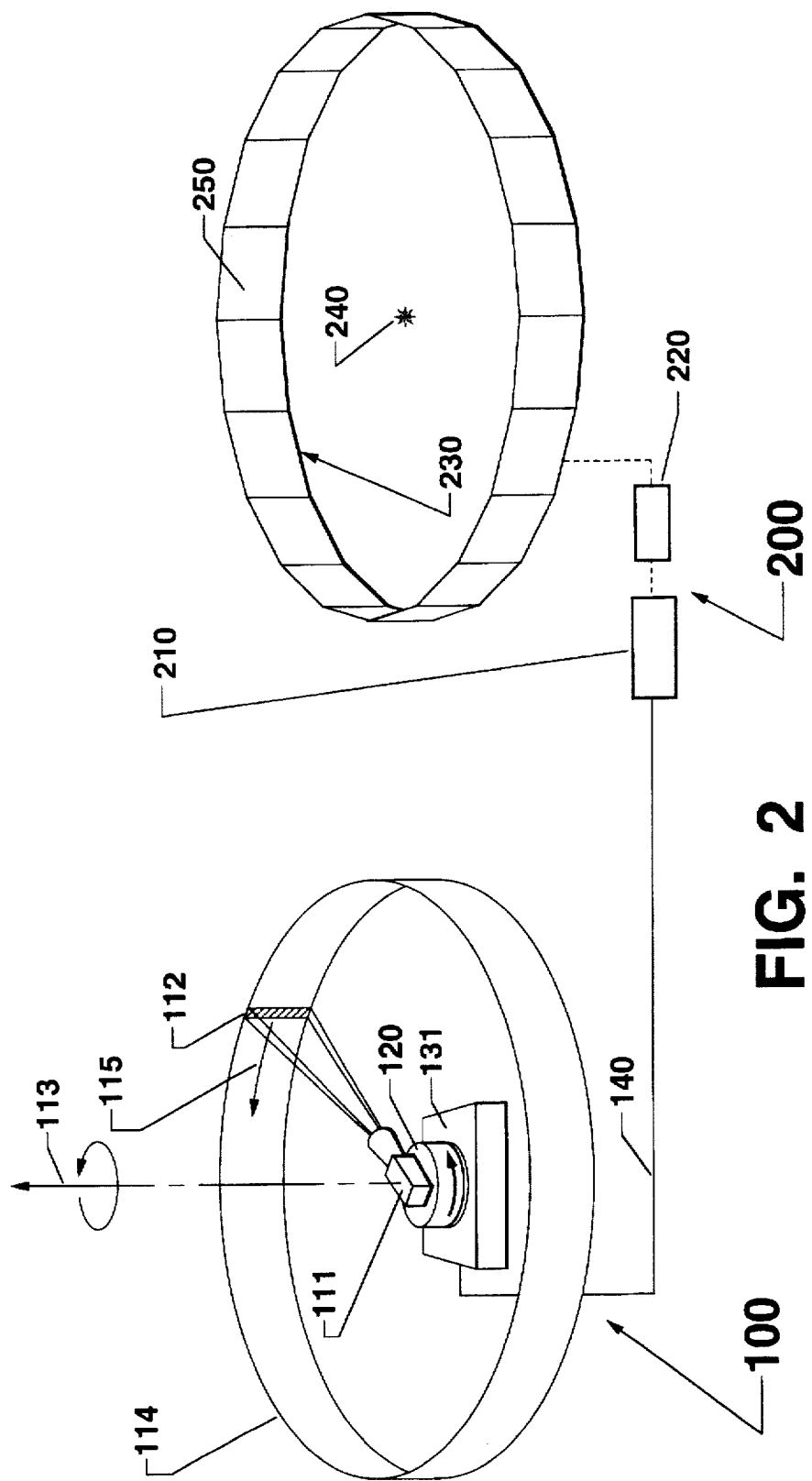
FIG. 2 illustrates the basic system according to the present invention in schematic form.

The present invention is a high-resolution panoramic television surveillance system having a wide-angle synoptic field of view. As illustrated in its basic form in FIG. 1 the basic system preferably comprises two fundamental elements: a full-panorama synoptic imaging sensor 1, and a synoptic-panoramic-image surveillance evaluation processor 2. Synoptic imaging sensor 1 is contained in an image-sensing station 100. Surveillance evaluation processor 2 is contained in an image-monitoring station 200. Said system is illustrated in greater detail in FIG. 2. Image-sensing station 100 comprises a line-format imaging sensor 111 with a line-format field of view 112. Line-format imaging sensor 111 is mounted on a platform 120 rotatable about azimuthal scan-rotational axis 113. Said line-format imaging sensor 111 collects synoptic panoramic image data for a full panoramic wide-angle field 114 which is delivered by an image-data-delivery line 140, which incorporates a rotary-joint data link (not shown), to said image-monitoring station 200. Said image-monitoring station 200 comprises an image-data processor 210, a display buffer-storage 220, a synoptic panoramic wide-angle array 230 of visual monitor displays, which displays a continuous synoptic panoramic view 250 to observer personnel at position 240, to permit continuous synoptic evaluation of the full panoramic scene 114, up to 360° wide.

Four primary alternative embodiments of the present invention are described herein. Each of the four embodiments comprises the same synoptic imaging sensor 1 and image-sensing station 100, and a different form of surveillance evaluation processor 2 and image-monitoring station 200.

The differing versions of image-monitoring station 200 for the four embodiments, as well as the elements that comprise each such embodiment, are distinguished by the final digit of the corresponding numeral identifiers. Hence, image-monitoring station 201 for the first embodiment, image-monitoring station 202 for the second embodiment, image-monitoring station 203 for the third embodiment, and image-monitoring station 204 for the fourth embodiment. Each of said four embodiments comprises the same, common, configuration for image-sensing station 100, including all features of said station 100.

GENERAL DESCRIPTION OF THE FIRST EMBODIMENT

Figure 3:
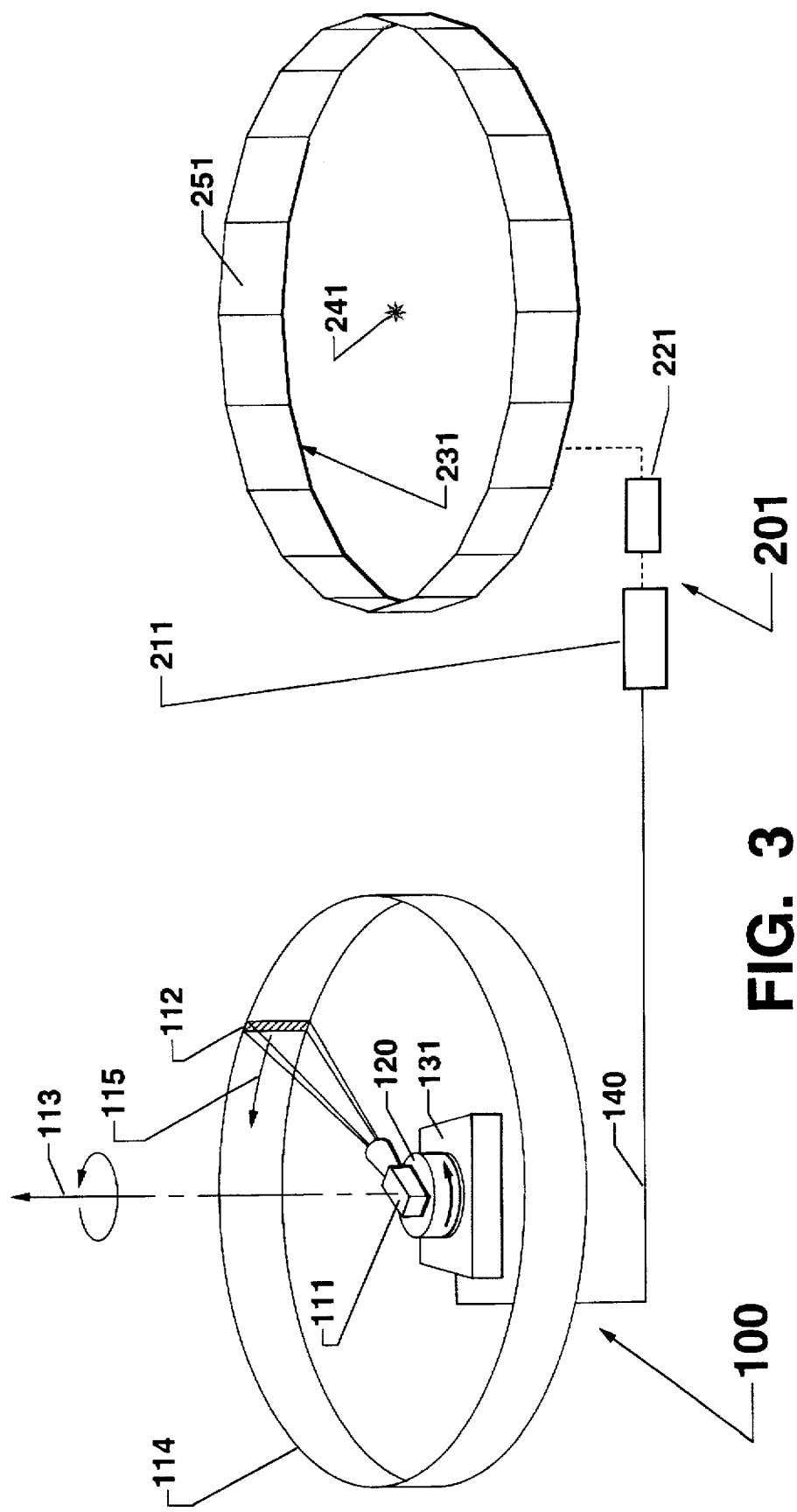
FIG. 3 shows the first embodiment of the system in schematic-diagram form.

The first embodiment of the present invention is illustrated schematically in FIG. 3. Said first embodiment of the present invention is distinguished functionally from the second, third, and fourth embodiments in that the first embodiment involves manual surveillance evaluation of the total-panoramic-field of continuously collected image data. Said surveillance evaluation involves continuous direct visual monitoring by observer personnel of the total synoptic panoramic wide-angle surveillance scene 114 which is being continuously collected by imaging sensor 111 and continuously displayed in the form of a total synoptic panoramic wide-angle view 251 by a full-panorama array 231 of visual monitor displays. This process enables the observer personnel to immediately visually detect and evaluate situations of potential surveillance interest in the area which is being imaged by said image-sensing station 100.

The first embodiment comprises an image-sensing station 100 and an image-monitoring station 201. Image-sensing station 100 comprises an imaging sensor 111, a rotatable platform 120 on which sensor 111 is mounted, an image-data-delivery line 140, and a stationary platform 131 which supports rotatable platform 120.

Imaging sensor 111 has a linear, or line-format, type of field of view 112. Said linear field of view 112 has its larger, or height, dimension measured in a vertical, or elevation direction, and its smaller, or width, dimension measured in an azimuthal direction, orthogonal to said larger dimension, and being extremely narrow in comparison to that in the elevation direction.

Rotatable platform 120 and imaging sensor 111 are caused to continuously rotate together at a predetermined uniform rate about an azimuthal scan-rotational axis 113 by a rotation-effecting drive (not shown), and accordingly stationary line-type field of view 112 of sensor 111 moves in a circular locus about axis 113 and traverses the full-scene panoramic wide-angle field of view 114 once every rotational, or scanning, cycle whereby image data is continuously collected from said panoramic wide-angle field. Panoramic wide-angle field of view 114 is preferably 360°. Line-type field of view 112 is scanned in an azimuthal direction 115 perpendicular to scan-rotational axis 113.

The interval of said rotational, or scanning, cycle is preferably preselected to be of sufficiently short duration as to assure the provision of an effectively "live" television-like surveillance image of the scene area of interest, while at the same time not being so short as to require unnecessarily wide data bandwidths and unnecessarily high associated costs. The fundamental objective in this pre-selection process for each individual application of the invention is a cycle interval for panoramic scene scanning, image-data processing, and display just sufficiently short to capture all significant motions and changes that occur within the panoramic scene view. Typical cycle intervals in the general surveillance context are of the order of one second, ranging from less than one tenth of one second to tens of seconds.

The resulting stream of image data from imaging sensor 111 is continuously delivered by said image-data-delivery line 140 across the rotational interface between said rotatable platform 120 of image-sensing station 100 and said stationary, or non-rotatable platform 131 of image-sensing station 100 to an image-data processor 211 of monitoring station 201.

Image-data-delivery line 140 comprises a rotary-joint data link (not shown) which transmits an image-data signal in a manner unaffected by the continuous rotation of imaging sensor 111 relative to the non-rotating parts of the system. This important feature eliminates the need to incorporate an optical image derotation device in said imaging sensor.

Image-monitoring station 201 comprises image-data processor 211, a display buffer-storage 221, and a full-panorama wide-angle synoptic array 231 of visual monitor displays.

Image-data processor 211 of image-monitoring station 201 receives said image-data stream from image-data-delivery line 140 of image-sensing station 100, performs pre-selected image-processing functions on said image-data stream, and delivers the resulting processed image data to display buffer-storage 221 from which it is continuously displayed, in the form of an effectively "live" television-like image of total synoptic panoramic view 251 of the collected scene, to observer personnel located at a position 241 by full-panorama wide-angle synoptic array 231 of visual monitor displays.

Display buffer-storage 221 temporarily sustains, or stores, the most recently collected image being continuously displayed by said array 231 until said image is replaced, or updated, by the next collected image.

Full-panorama wide-angle synoptic array 231 is preferably arranged in an approximately circular pattern about the position 241 for observer personnel. Said array 231 continuously presents to said observer-personnel position 241 a complete synoptic panoramic wide-angle view 251 of the imaged scene.

DETAILED DESCRIPTION OF THE FIRST EMBODIMENT

Image-sensing station 100

Figure 4:
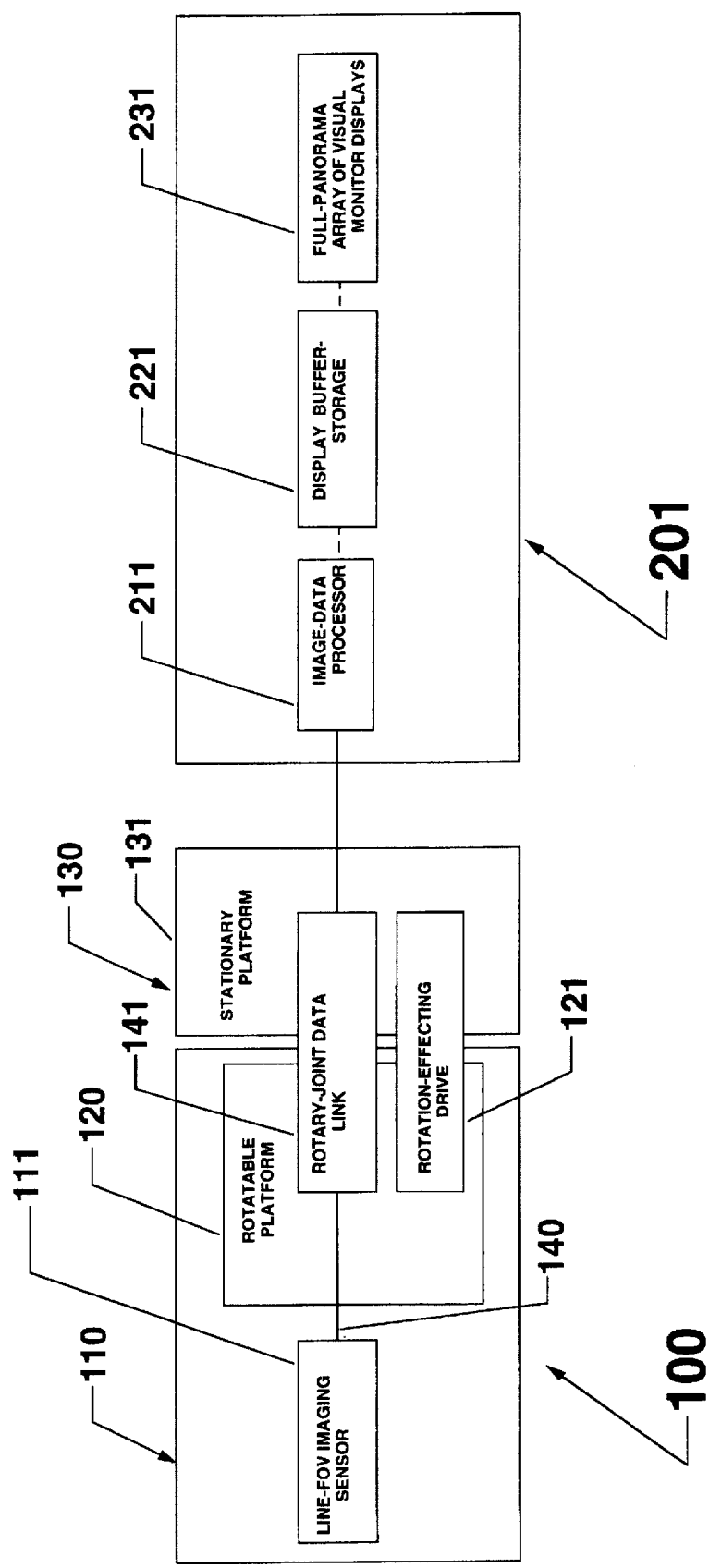
FIG. 4 shows the first embodiment of the system in block diagram form.

Additional aspects of the image-sensing station 100 are indicated in FIG. 4 in block diagram form. It is noted here that the following description of image-sensing station 100 applies to all four embodiments of the present invention. Image-sensing station 100 comprises a rotatable portion 110 and a non-rotatable, or stationary, portion 130. Rotatable portion 110 comprises imaging sensor 111 and rotatable platform 120 on which sensor 111 is mounted.

Connected to rotatable platform 120 is a rotation-effecting drive 121 which drives rotatable platform 120 to rotate about azimuthal scan-rotational axis 113 (FIG. 3) relative to stationary platform 131. For example, rotation-effecting drive 121 can be a conventional servo motor connecting through a gear train.

The panoramic wide-angle field collected by the system may be 360° wide and the rotation-effecting drive 121 provides continuous rotation which may be uninterruptedly unidirectional, or may alternatively be bidirectional with rotation in a scanning direction 115 (FIG. 3) interrupted only briefly for reversal of direction in order to repeat the scanning motion.

Imaging sensor 111 may alternatively comprise a single imaging sensor, or a plurality of imaging sensors. Said imaging sensor may take any one of a number of alternative forms. For example, it may comprise a line scanner which comprises one or more radiation-detector elements and an optical-mechanical line-scanning device operated in such a manner as to scan out a line field of view in the elevation direction. Alternatively, said imaging sensor may comprise a linear array of detector elements arranged to statically image a line field of view comparable to said line scanner, also in the elevation direction. Another alternative is a two-dimensional linear array of detector elements employing the principle of time delay and integration, or TDI, wherein one dimension of said array statically images a line field of view in the elevation direction, and the orthogonal second direction is aligned parallel to the direction of the system's azimuthal scan rotation, thereby allowing multiple successive steps of exposure integration to occur during the process of image scanning.

Said imaging sensor may operate in the electro-optical waveband, including the ultraviolet, visual, and infrared portions of the electromagnetic spectrum.

Within said plurality of imaging sensors, the spatial angular resolution and field-of-view dimensions of each of the images collected by each of said imaging sensors may alternatively be matched one to another, or may be different one from another.

The pointing direction of each said imaging sensor may be orthogonal to azimuthal scan-rotational axis 113 or it may be elevated or declined with respect to orthogonal. Said elevation and declination of imaging sensor pointing direction may be effected manually, or by remotely controlled means (not shown).

Within said plurality of imaging sensors, each said imaging sensor may collect image data at a separate time from the other said imaging sensors, or a plurality of said imaging sensors may be operated concurrently, provided that the angular imaging rate of each of the images being collected by each of said imaging sensors is set equal to that of all other images being collected at the same time.

The angular rate of rotation of said rotatable platform 120 is precisely matched to the angular imaging rate of the imaging sensors in operation. Said angular imaging rate is equal to the arithmetical product of the imaging line rate of said imaging sensors and the angular resolution of an individual pixel line of each of the images being collected by said imaging sensors.

Image-data-delivery line 140 comprises rotary-joint data link 141. Delivery line 140 accepts the image-data stream from imaging sensor 111 and conveys said data stream via said rotary-joint data link 141, and across said intervening rotational interface (not shown), to stationary platform 131 from which said data stream passes to image-data processor 211 within image-monitoring station 201.

Rotary-joint data link 141 may alternatively be of bidirectional form, providing the capability to simultaneously transmit said image data, instrumentation data regarding the status and condition of system elements mounted on the rotatable portion 110 of said image-sensing station 100, and data to control the operation of system elements mounted on said rotatable portion 110 of said image-sensing station 100.

Said rotary-joint data link 141 comprises a rotatable part (not shown) and a non-rotatable part (not shown). Rotation-effecting drive 121 also has a rotatable part (not shown) and a non-rotatable part (not shown). Said rotatable parts of rotation-effecting drive 121 and rotary-joint data link 141 are mounted to rotatable platform 120. Said non-rotatable parts of rotation-effecting drive 121 and rotary-joint data link 141 are mounted to stationary platform 131. Said rotatable part of rotary-joint data link 141 is constrained by alignment means such as rotational bearings to rotate, along with rotatable platform 120, only about an axis coincident with said scan-rotation axis 113 (FIG. 3) relative to said non-rotatable part of rotary-joint data link 141.

An important feature of said rotary-joint data link 141 is the complete independence of all characteristics of said transmitted signal with respect to the rotational position and motion of said rotatable part of said rotary-joint data link 141 relative to said non-rotatable part of said data link 141. For the alternative of scanning motion involving unidirectional angular rotation, as opposed to bidirectional, or oscillatory, angular motion, an additional feature is important. Said additional feature is the accommodation of unlimited unidirectional angular rotation between the elements mounted to rotatable platform 120 and the elements mounted to stationary platform 131, free from any rotational restraints, limitations, or influences.

Rotary-joint data link 141 is preferably in the form of an electromagnetic-radiation-beam rotary-joint data link, comprising a rotatable part and a non-rotatable part. Said electromagnetic-radiation-beam rotary-joint data link may operate in the optical waveband, or alternatively in the radio-frequency waveband. Said optical and radio-frequency rotary-joint links may transmit data streams in one direction only, or alternatively in two directions. Each direction of transmission of said rotary-joint links may carry a single data stream, or may simultaneously carry a plurality of data streams by such means as wavelength-division multiplexing, or frequency-division multiplexing.

Figure 5:
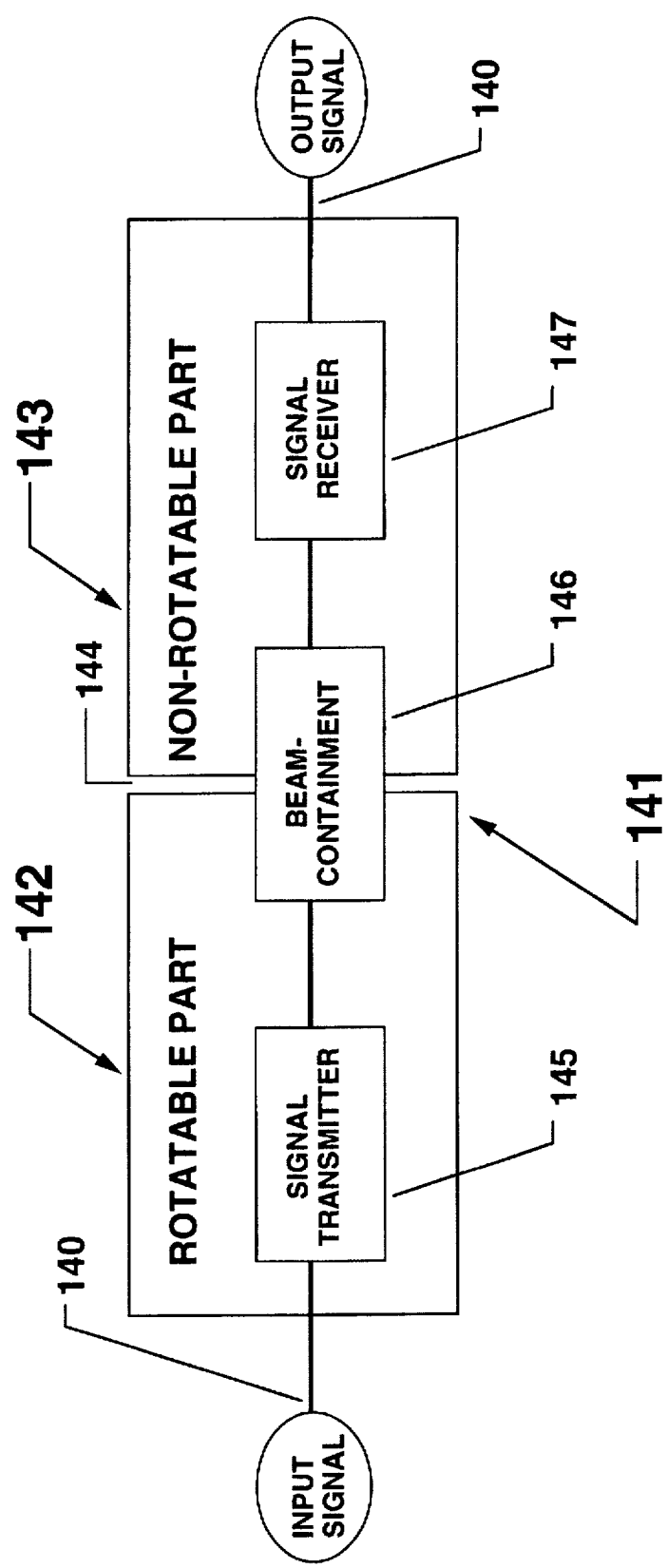
FIG. 5 shows a rotary-joint data link.

FIG. 5 illustrates said electromagnetic-radiation-beam rotary-joint data link 141, comprising a rotatable part 142 and a non-rotatable part 143. Said rotatable part 142 comprises a signal transmitter 145, and said non-rotatable part 143 comprises a signal receiver 147. Intervening rotational interface 144 separates rotatable part 142 and non-rotatable part 143. A beam-containment means 146 causes the signal-carrying electromagnetic beam transmitted by said signal transmitter 145 to travel from said signal transmitter 145, along the rotational axis of said electromagnetic-radiation-beam rotary-joint data link, and across rotational interface 144 toward said signal receiver 147 in a manner such that the characteristics of said arriving signal are invariant with regard to the rotational position and motion of said rotatable part 142 relative to said non-rotatable part 143. Part of said beam-containment means 146 is mounted to said rotatable part 142, and the remainder of said beam-containment means 146 is mounted to said non-rotatable part 143.

Figure 6:
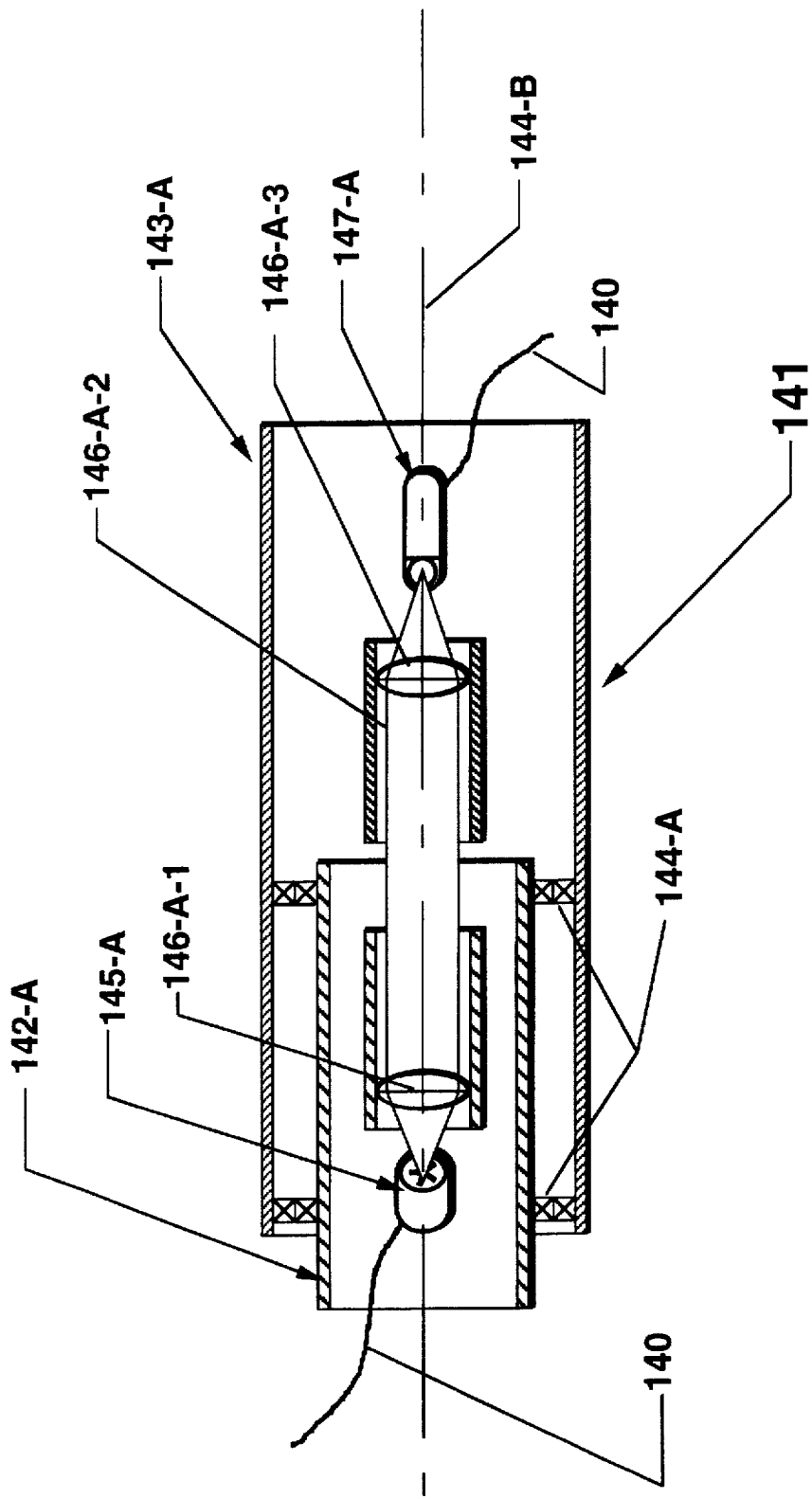
FIG. 6 shows an optical rotary-joint data link.

An example of an optical form of said electromagnetic-radiation-beam rotary-joint data link operating in the optical waveband is illustrated in FIG. 6. Rotatable optical transmitter assembly 142-A comprises optical signal transmitter 145-A, collimating optics 146-A-1, and rotational bearings 144-A.

Optical signal transmitter 145-A radiates optical energy which contains said image-data signal into collimating optics 146-A-1 which form said beam into a collimated beam of light 146-A-2.

Rotatable transmitter assembly 142-A corresponds to rotatable part 142 of FIG. 5. Said assembly 142-A of FIG. 6 preferably has a tubular exterior shape and is mounted to rotational bearings 144-A which constrain assembly 142-A to rotate only about a rotational axis 144-B of said assembly 142-A. Rotational bearings 144-A correspond to the mechanical aspects of rotational interface 144 of FIG. 5, while collimated signal-bearing light beam 146-A-2 of FIG. 6 corresponds to the data-signal transmission across said rotational interface. Said rotational axis 144-B is coincident with scan-rotation axis 113 of rotational platform 120 of FIG. 3.

In addition, in FIG. 6, optical signal transmitter 145-A, collimating optics 146-A-1, collimated signal-bearing light beam 146-A-2, and rotational bearings 144-A each has an axis of rotational symmetry coincident with said rotational axis 144-B.

Non-rotatable optical receiver assembly 143-A in FIG. 6 corresponds to non-rotatable part 143 of FIG. 5, and comprises focusing optics 146-A-3 and an optical signal receiver 147-A. Collimating optics 146-A-1 of FIG. 6 and focusing optics 146-A-3 together correspond to beam-containment means 146 of FIG. 5. Collimated beam of light 146-A-2 of FIG. 6 is intercepted by focusing optics 146-A-3 which focus the light beam onto optical signal receiver 147-A which corresponds to signal receiver 147 of FIG. 5. Said focusing optics 146-A-3 of FIG. 6 and signal receiver 147-A also each has an axis of rotational symmetry coincident with said rotational axis 144-B. Said focusing optics 146-A-3 and signal receiver 147-A are mounted to non-rotatable optical receiver assembly 143-A.

One implementation of the optical form of rotary-joint data link 141 described above comprises the "fiber optic rotary-joint" which is commercially available from Focal Technologies, Inc. of Dartmouth, Nova Scotia, and from Lytton Poly-Scientific of Blacksburg, Va.

Image-monitoring station 201

As indicated in FIG. 3 and FIG. 4, image-data processor 211 preferably comprises an electronic image-processing device which provides conventional image processing. Said image-processing device continuously receives said image-data stream from image-data-delivery line 140 of image-sensing station 100 and performs standard preselected image-processing functions on said image-data stream. Said pre-selected processing functions convert the raw image data from said imaging sensor 111 into a form and format suitable for surveillance-evaluation display by said full-panorama wide-angle synoptic array 231 of visual monitor displays to said observer personnel. The resulting processed image data is continuously delivered to a display buffer-storage 221 from which it is continuously displayed, in the form of an effectively "live" television-like image of a synoptic panoramic view 251 of the collected scene, by said full-panorama wide-angle synoptic array 231 of visual monitor displays.

Said image-data processor 211 preferably performs only such standard image-data processing of the image data output by imaging sensor 111 necessary to display the collected image data with accurate spatial and intensity fidelity on synoptic panoramic wide-angle array 231 of visual monitor displays.

Said processor 211 further includes standard provisions for routing, or distributing, the appropriate portions of the processed image data for the most recently collected panoramic scene-scan image to the corresponding individual monitor display elements of said display buffer-storage 221 and said synoptic panoramic wide-angle array 231.

Image-data processor 211 may alternatively include additional processing employing established image-data processing routines to improve the visual detection capability of observer personnel by selectively emphasizing the appearance of pre-selected categories of scene content, pre-selected types of changes in scene content, or preselected locations within the scene field. Such display emphasis may comprise such characteristics as localized blinking regions of interest, modified gray-scale tonal rendition, false-color display, etc., well known to those skilled in the field of the invention.

Data processor 211 may further comprise a means for recording the image data collected by sensor 111 for extended periods of time, for such purposes as off-line processing and evaluation.

Display buffer-storage 221 temporarily sustains, or stores, the most recently collected panoramic scene-scan image for continuous display by said panoramic array 231 of visual monitor displays until said image is replaced, or updated, by the corresponding image-data collected during the next image-collection scan cycle.

It is noted that the period of the image-collection scan cycle of said imaging sensor 111, nominally of the order of one second, is in general much longer than the period of the raster-scan cycle of conventional visual monitor displays, which is typically in the tens of milliseconds. As a result, during the interval between successive image-collection scans, the image displayed by said array 231 of visual monitor displays is sustained in time by said display buffer-storage in such manner as to avoid any temporal fluctuation of the brightness level (flicker or dimming) of the displayed image which is objectionably perceptible visually to the observer personnel. Said temporary sustaining, or storage, of the previously scanned image until the arrival of the next scanned image may be accomplished by one of several alternative means, including the following:

a) storage of each pixel of said image by means comprising electronic or magnetic storage-media devices from which it is repeatedly input to each said visual monitor display in synchronism with the known raster-scan cycle of said monitor for each of the many raster-scan cycles that occur between image-collection scans; an example of this form of image-data buffer storage is the buffer-refresh random-access-memory storage used in the visual monitor display of a personal computer, with a raster-scan cycle of approximately one sixtieth of one second.

b) inherent storage within each said visual monitor display device itself through the use of that type of visual monitor display comprising an image-display medium characterized by a visual-radiation time constant approximately equal to the scan cycle of said imaging sensor 111. For said type of monitor display, the raster-scan period is controlled to be synchronized to that of the imaging sensor 111, such that the image sector displayed on each of said monitor displays is raster-scanned only once per imaging-sensor scan cycle; an example of this form of image-data buffer storage is the cathode-ray-tube monitor displays using long-persistence phosphors to radiate the image, as employed in some conventional radar-system displays.

Synoptic panoramic wide-angle array 231 of visual monitor displays is of sufficient number and spatial arrangement, about the position 241 of the observer personnel, so as to accurately correspond to the total contiguous panoramic wide-angle scene field of view 114 being collected by said imaging sensor 111.

Said array 231 of visual monitor displays comprises a plurality of visual monitor displays preferably arranged in an approximately circular geometric arrangement, with each of said visual monitors facing said observer-personnel position 241, so as to faithfully depict to observer personnel the uninterrupted synoptic contiguous spatial interrelationship among all elements of the panoramic scene 114 collected by imaging sensor 111.

Said visual monitor displays of array 231 are preferably selected from the group consisting of cathode-ray-tube displays, flat-panel displays, rear-projection displays, and front-projection displays.

In addition, synoptic panoramic wide-angle array 231 is preferably arranged to provide the full synoptic panoramic view 251 in the form of a displayed image with a minimum width and number of spatial gaps, or interruptions, between the image-containing areas of adjacent displays of the over-all synoptic panoramic image. For the preferred panoramic wide-angle field of 360°, said array may take the full-circle form indicated in FIG. 3, with each illustrated rectangle representing an individual visual monitor display. Alternative arrangements to the basic configuration of said array 231, illustrated in FIG. 3 and FIG. 7-A, such as arrays 231-A and 231-B, as illustrated in FIG. 7-B and FIG. 7-C, may be used in situations where the specific form of image-monitoring station 201 indicate the need for subdividing array 231 into sectors. However, it is noted that such alternative arrangements involve the attendant partial compromise of the spatial integrity of the displayed image view 251 relative to the unbroken field of view 114 collected by imaging sensor 111, which exists for the arrangement of array 231 as illustrated in FIG. 3.

Synoptic panoramic wide-angle array 231 of visual monitor displays is further arranged such that the image field of view displayed on each said monitor display is preferably such that each individual picture element (pixel) displayed in said visual monitor-displays corresponds to no more than one individual pixel of said imaging sensor 111. Said correspondence of displayed resolution relative to imaging-sensor resolution may result in array 231 comprising a single row of visual display monitors as indicated in FIG. 3, or alternatively it may result in a plurality of such rows.

For clarity of description, the foregoing discussion of image monitoring station 201 addresses a single image-data processing and display path, or channel, for an individual imaging sensor as the imaging sensor 111. It is understood that for configurations of image-sensing station 100 in which a plurality of imaging sensors may be operated concurrently, a corresponding plurality of image-data processing and display paths, or channels, may be employed. Said parallel image-data processing and display paths may alternatively process and display the output image data from said separate concurrent imaging sensors individually or in combination.

GENERAL DESCRIPTION OF THE SECOND EMBODIMENT

The second embodiment of the present invention involves semi-automated surveillance evaluation of the panoramic image, as contrasted with said manual surveillance evaluation employed in the first embodiment as described above. Semi-automated surveillance evaluation is defined herein as delegating the function of continuous on-line surveillance evaluation to an automatic image-data processor, comprised within image-data processor 212 shown in FIG. 8, and involving said observer personnel only at those times when said automatic processor has determined that pre-established surveillance criteria have been met in the image data collected from the scene currently under surveillance.

DETAILED DESCRIPTION OF THE SECOND EMBODIMENT

Figure 8:
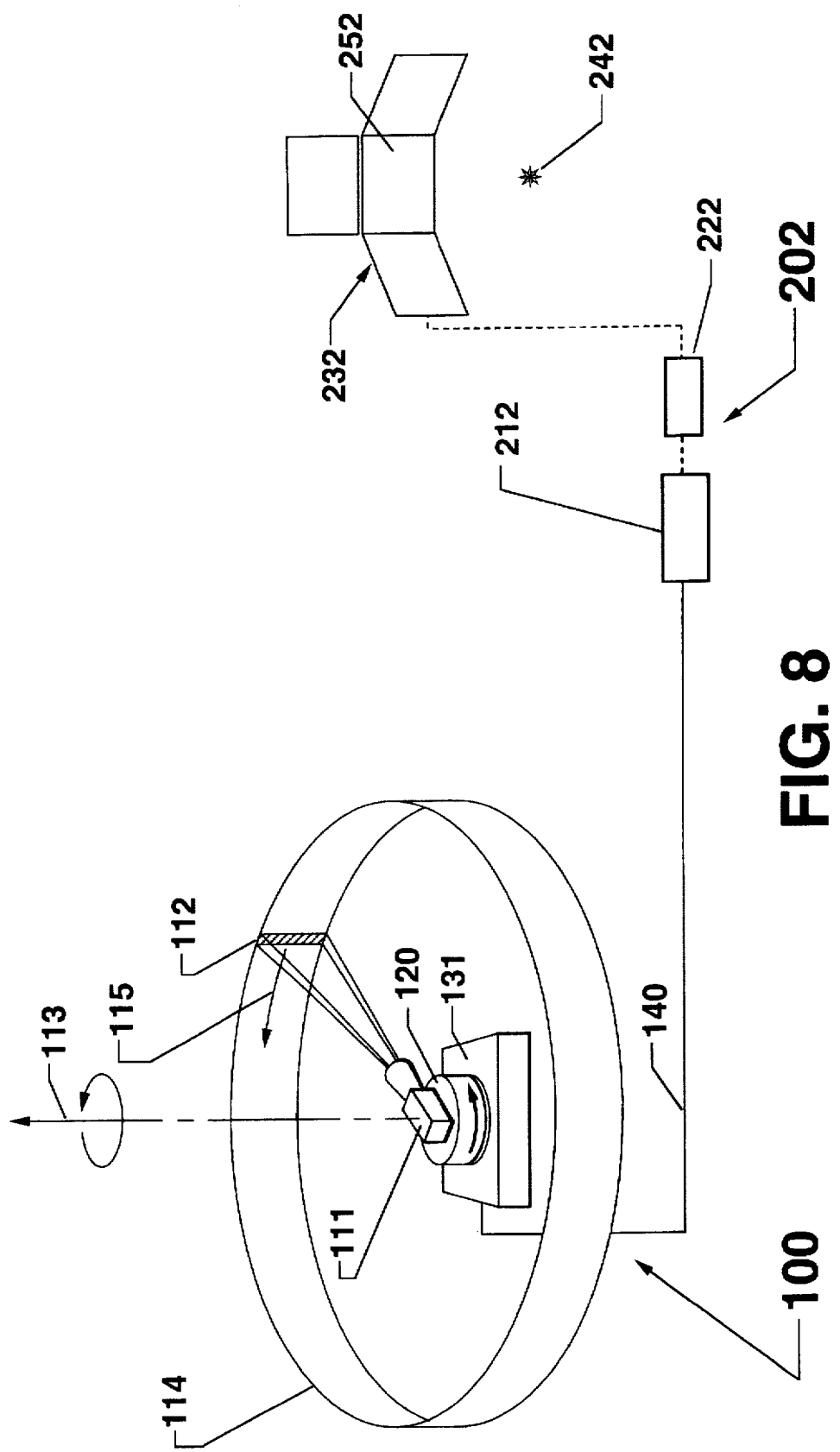
FIG. 8 shows the second embodiment of the system in schematic-diagram form.
Figure 9:
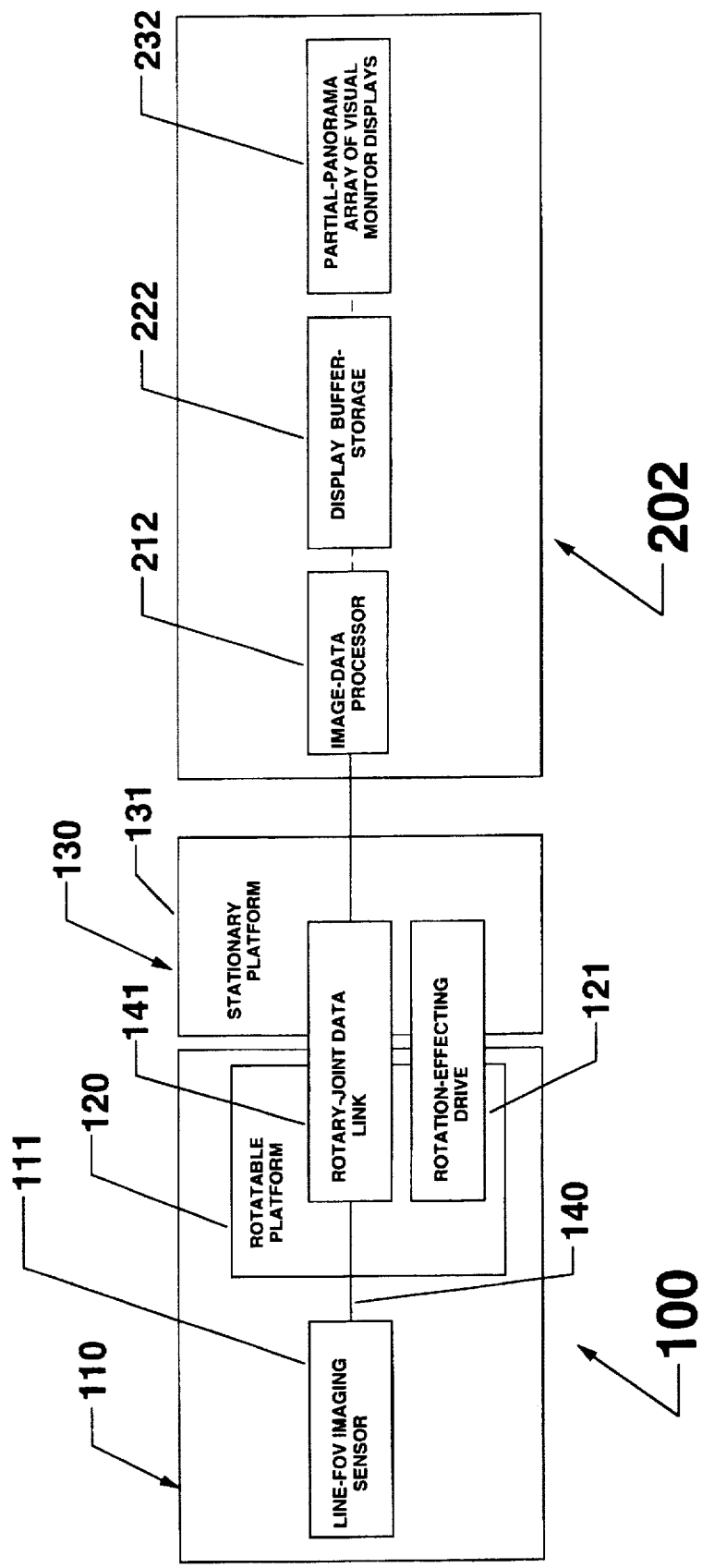
FIG. 9 shows the second embodiment of the system in block-diagram form.

The second embodiment will now be described with reference to FIG. 8 and FIG. 9. Said second embodiment of the present invention comprises an image-sensing station 100, with all features exactly as employed in the first embodiment as described above. Image-monitoring station 202 is different from image-monitoring station 201 of the first embodiment as described below.

In the second embodiment, image-data processor 212 preferably comprises a high-speed electronic processing device and established image-processing routines to continuously provide real-time sophisticated image-data-processing to perform specified automated surveillance-evaluation functions in such a manner as to automatically and immediately determine the presence of scene elements which satisfy predetermined criteria indicating the presence of scene situations to be of potential surveillance interest. Image-data processor 212 preferably employs routines for recognition of various predetermined target characteristics including shapes, motions, and signatures. Alternatively, data processor 212 may employ routines to detect change in the surveillance scene between successive image scans. In this manner, image-data processor 212 invokes the attention of the operator personnel only in situations likely to be of interest, avoiding the undesirable degradation of operator personnel effectiveness due to extended periods of fruitless visual concentration when the imaged scene proves to contain no situations of potential surveillance interest.

Said image-data processor 212 also preferably performs appropriate standard image-data processing, as performed by said image-data processor 211 as described above for the first embodiment, of the image data output by imaging sensor 111 necessary to display the collected image data with accurate spatial and intensity fidelity on synoptic panoramic wide-angle array 232 of visual monitor displays.

Consequently the second embodiment has the advantage that said observer personnel can remain off-line and relaxed until such time as such processing has determined the presence of scene situations of potential interest; only at such times does image-data processor 212 perform the following two additional functions: 1) provide an alert signal, and then 2) display to said observer personnel only those selected portions of said total wide-angle field of view 114 collected by imaging sensor 111 which said portions have been determined by said processor 212 to be of potential surveillance interest.

Data-processor 212 may further comprise a means for recording the image data collected by sensor 111 for extended periods of time, for purposes of off-line processing and evaluation.

In addition to said automatic surveillance-evaluation and alerting functions, image-data processor 212 may perform the same display-related functions as are performed in the first embodiment by image-data processor 211 (FIG. 3), although only for said smaller selected fractional portions of said total wide-angle field of view 114 collected by imaging sensor 111 determined by said processor 212 to be of potential surveillance interest.

It is evident that the second embodiment, displaying only selected portions of the total wide-angle field of view 114 collected by imaging sensor 111, may employ a partial-panorama wide-angle synoptic array 232 comprising a smaller number of visual monitor displays than would be employed for the first embodiment which would be displaying the total panoramic wide-angle image 251 (FIG. 3).

Partial-panorama wide-angle synoptic array 232 retains all said characteristics of array 231 (FIG. 3) employed for the first embodiment, as described above, with the exception of said smaller number of monitor displays.

Display buffer-storage 222 for the second embodiment retains all characteristics of display buffer-storage 221 (FIG. 3) employed for the first embodiment, as described above, except for the smaller capacity associated with said smaller number of monitor displays.

The foregoing description of image monitoring station 202 addresses a single image-data processing and display path, or channel, for an individual imaging sensor as the imaging sensor 111. It is understood that for configurations of image-sensing station 100 in which a plurality of imaging sensors may be operated concurrently, a corresponding plurality of image-data processing and display paths, or channels, may be employed, providing a combination of separate-sensor and combined-sensor displays.

GENERAL DESCRIPTION OF THE THIRD EMBODIMENT

Figure 10:
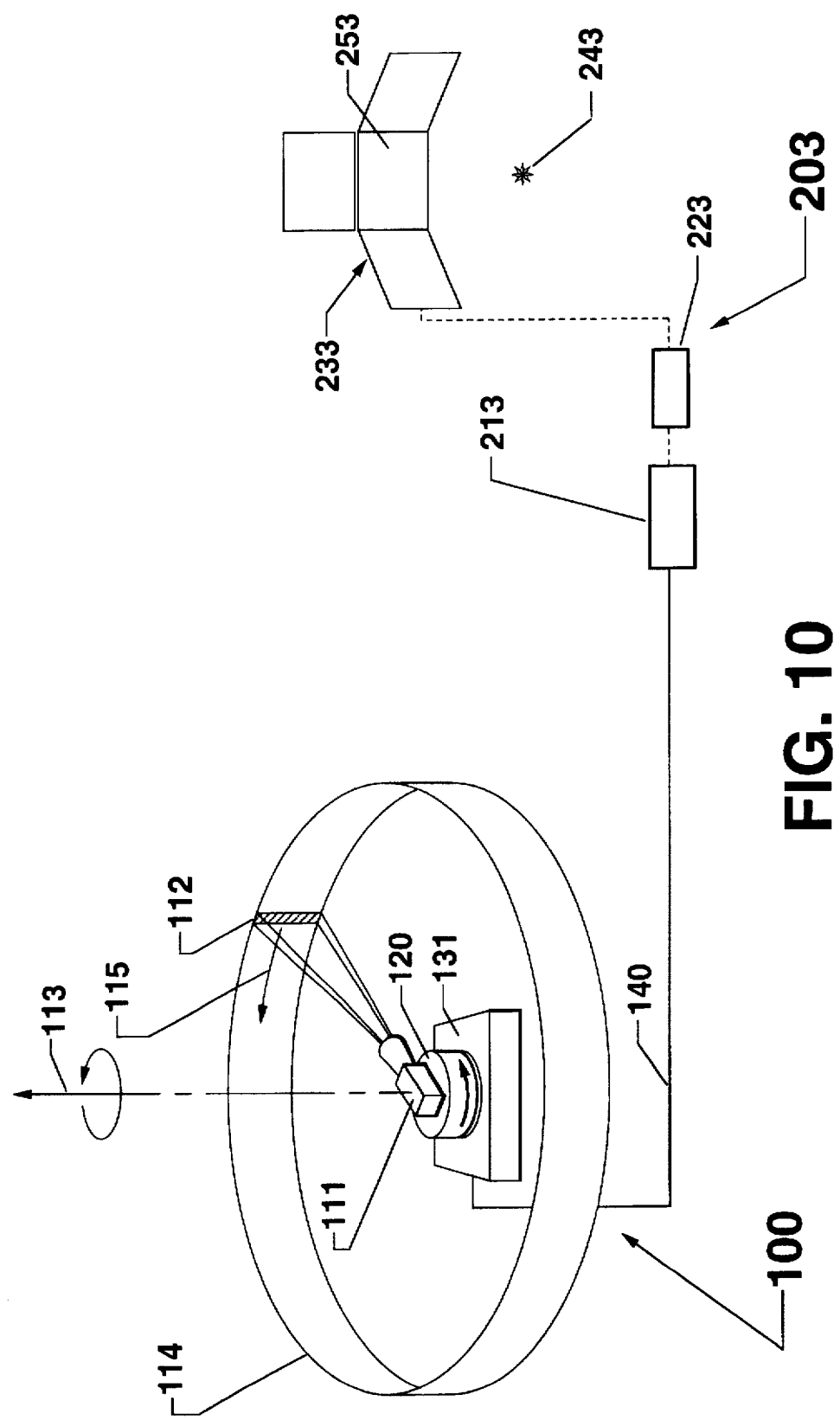
FIG. 10 shows the third embodiment of the system in schematic-diagram form.

The third embodiment of the present invention involves sector-field manual surveillance evaluation of the panoramic image, as contrasted with said total-panoramic-field manual surveillance evaluation employed in the first embodiment, and as contrasted to the semi-automated surveillance evaluation employed in the second embodiment, as described above. Sector-field manual surveillance evaluation is defined herein as intermittent direct visual monitoring by observer personnel, similar to the first embodiment, but of only one, or more, selected narrow-angle portions, at any one time, of the total synoptic panoramic wide-angle surveillance scene 114 which is being continuously collected by imaging sensor 111. Said selected portion, or portions, of total synoptic panoramic wide-angle surveillance scene 114 are continuously displayed by partial-panorama array 233 of visual monitor displays until the next sector, or sectors, are selected for evaluation, as shown in FIG. 10. This process enables the observer personnel to immediately visually detect and evaluate situations of potential surveillance interest in any said selected sector area of the total panoramic wide-angle surveillance scene which is being continuously imaged by image-sensing station 100. This process enables said observer personnel to evaluate a displayed image 253 and a monitor array 233 of much smaller expanse at any one time than is involved in the first embodiment.

DETAILED DESCRIPTION OF THE THIRD EMBODIMENT

Figure 11:
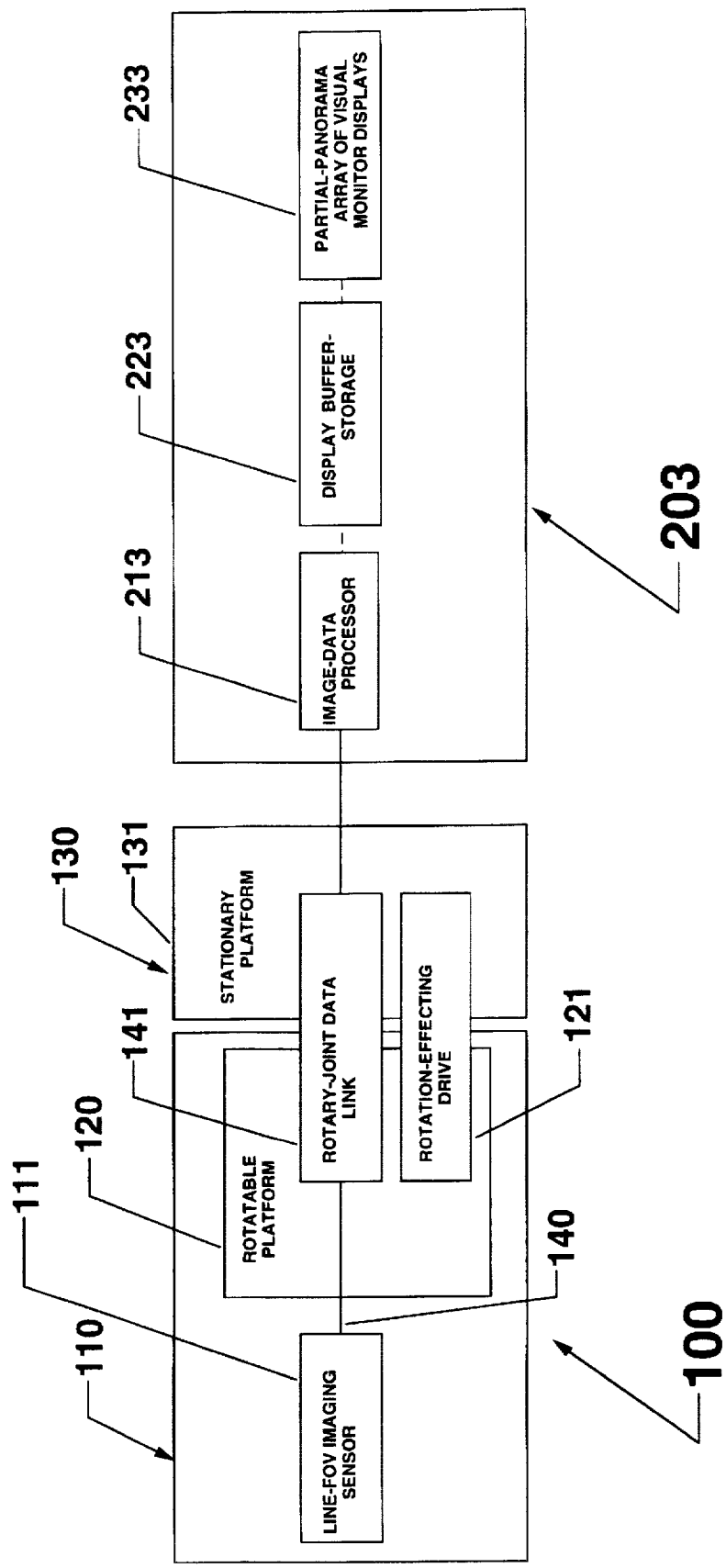
FIG. 11 shows the third embodiment of the system in block-diagram form.

The third embodiment is now described with reference to FIG. 10 and FIG. 11. The third embodiment of the present invention comprises an image-sensing station 100, with all features exactly as employed in the first embodiment as described above. Image-monitoring station 203 is different from image-monitoring station 201 of the first embodiment as described below.

It is evident that the third embodiment, displaying only selected portions of the total wide-angle field of view 114 collected by imaging sensor 111, may employ a synoptic panoramic wide-angle array 233 comprising a smaller number of visual monitor displays than would be employed for the array 231 of the first embodiment which would be displaying the total panoramic wide-angle image 251 (FIG. 3).

Synoptic panoramic wide-angle array 233 retains all said characteristics of array 231 employed for the first embodiment, as described above, with the exception of said smaller number of monitor displays.

Image-data processor 213 retains all said characteristics of corresponding image-data processor 211 employed for the first embodiment, as described above, except for the smaller capacity associated with said smaller number of monitor displays in array 233.

Data-processor 213 may further comprise a means for recording the image data collected by sensor 111 for extended periods of time, for purposes of off-line processing and evaluation.

Display buffer-storage 223 for the third embodiment retains all characteristics of display buffer-storage 221 employed for the first embodiment, as described above, except for the smaller capacity associated with said smaller number of monitor displays in array 233.

The foregoing description of image monitoring station 203 addresses a single image-data processing and display path, or channel, for an individual imaging sensor as the imaging sensor 111. It is understood that for configurations of image-sensing station 100 in which a plurality of imaging sensors may be operated concurrently, a corresponding plurality of image-data processing and display paths, or channels, may be employed, providing a combination of separate-sensor and combined-sensor displays.

GENERAL DESCRIPTION OF THE FOURTH EMBODIMENT

The fourth embodiment of the present invention is distinguished from the preceding three embodiments in that it involves only image-data processing and recording of the collected image data of the total synoptic panoramic wide-angle surveillance scene, without involving the functions of on-line display and surveillance evaluation of the panoramic image collected. Surveillance evaluation of the collected image data is relegated to unspecified systems external to the system described in this embodiment of the present system.

DETAILED DESCRIPTION OF THE FOURTH EMBODIMENT

Figure 12:
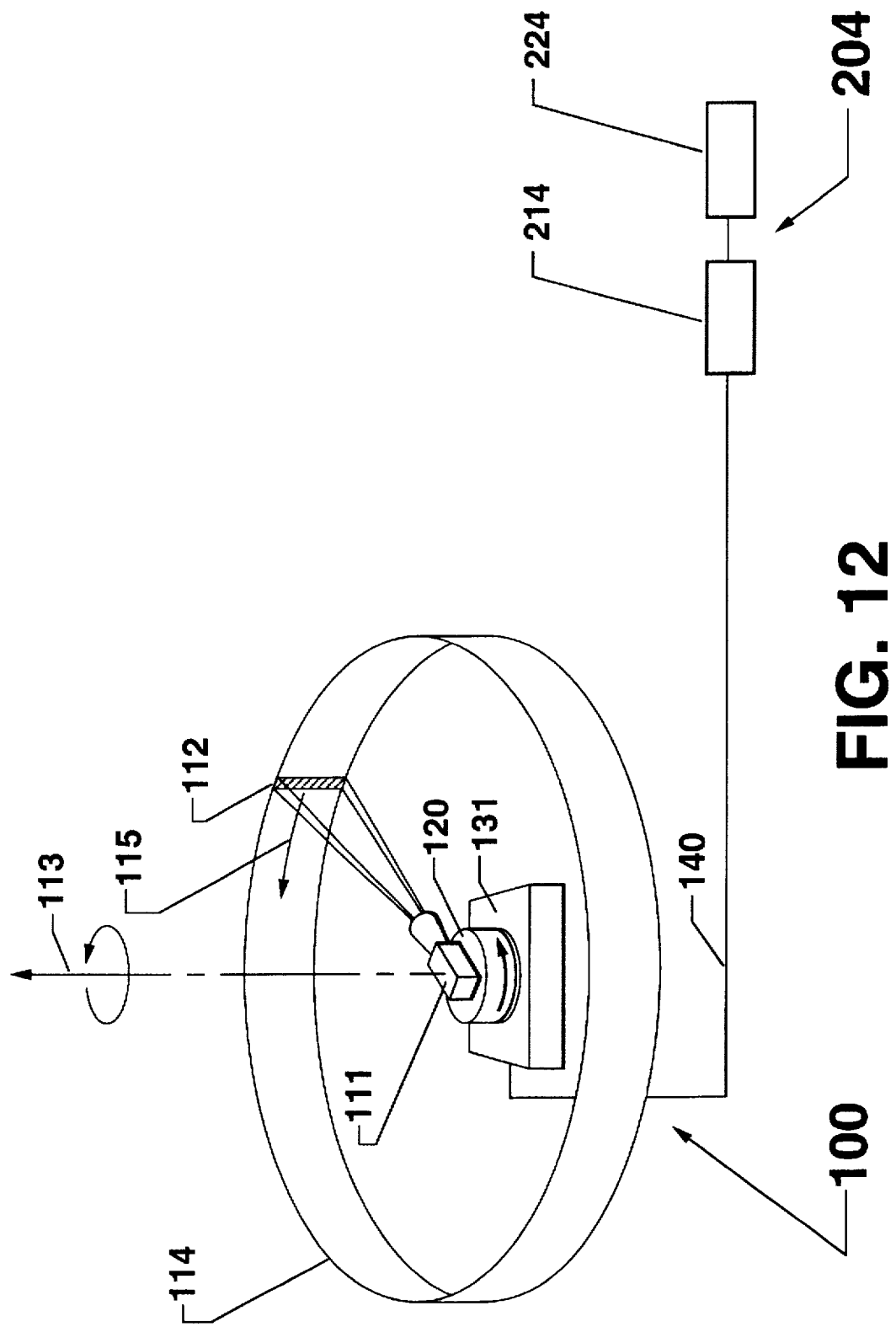
FIG. 12 shows the fourth embodiment of the system in schematic-diagram form.
Figure 13:
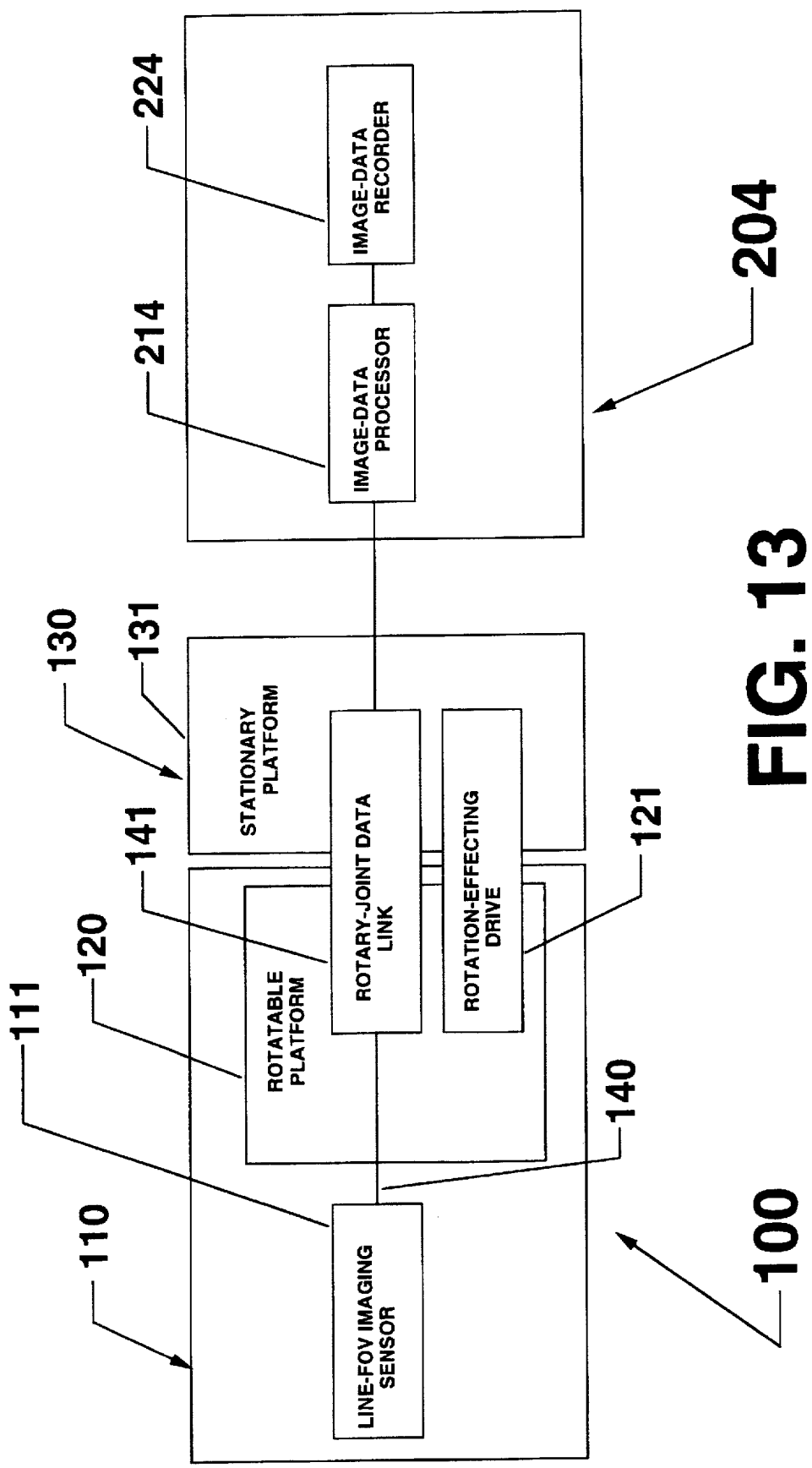
FIG. 13 shows the fourth embodiment of the system in block-diagram form.

The fourth embodiment of the present invention is illustrated in FIG. 12 and FIG. 13. Said fourth embodiment of the present invention comprises an image-sensing station 100, with all features as employed in the three preceding embodiments as described above. Image-monitoring station 204 is different from image-monitoring stations 201, 202, and 203 of said three previous embodiments in that station 204 comprises only an image-data processor 214 and an image-data recorder 224.

Image-data processor 214 of image-monitoring station 204 continuously receives said image-data stream from image-data-delivery line 140 of image-sensing station 100, performs pre-selected image-processing functions on said image-data stream to convert it into a form and format suitable for surveillance-evaluation recording, and subsequent surveillance-evaluation processing. As noted above, said subsequent surveillance-evaluation processing of the collected image data is relegated to unspecified systems external to the system described in this embodiment of the present system.

Image-data processor 214 preferably comprises an electronic image-processing device with established image-processing routines. Said processing device continuously receives said image-data stream from image-data-delivery line 140 of image-sensing station 100 and performs standard pre-selected image-processing functions on said image-data stream. Said pre-selected processing functions convert the raw image data from said imaging sensor 111 into a form and format suitable for surveillance-evaluation recording. After said image-processing device processes said image data, image-data recorder 224 records said processed image data for subsequent, off-line, surveillance evaluation.

For clarity of description, the foregoing discussion of image monitoring station 204 addresses a single image-data processing and recording path, or channel, for an individual imaging sensor as the imaging sensor 111. It is understood that for configurations of image-sensing station 100 in which a plurality of imaging sensors may be operated concurrently, a corresponding plurality of image-data processing and recording paths, or channels, may be employed. Said parallel image-data processing and recording paths may alternatively process and record the output image data from said separate concurrent imaging sensors individually or in combination.

In summary, the present invention provides a system having significantly superior performance and cost characteristics for the field of real-time panoramic wide-angle high-resolution imaging surveillance applications, as compared to that of the prior art. The present invention uniquely provides the combination of very high spatial resolution and full wide-angle panoramic synoptic real-time surveillance monitoring, and satisfies all five of the following fundamental performance criteria:

1. Continuous collection of the full wide-angle field-of-view panoramic synoptic image, typically a full-circle 360° field, of the surrounding scene.

The term "synoptic" is taken here to pertain to a spatially uninterrupted image, or a time sequence of such images, of a large area wherein each said image of the entire area is effectively collected at a single instant in time.

2. High spatial resolution in the collected input image, and equally high spatial resolution in the displayed output image, throughout the entire panoramic field of view. The term "high spatial resolution" is taken here to refer to images with a total spatial resolution of the order of 1,000 picture elements in a relatively narrow-field, e.g., elevation, dimension and 20,000 picture elements in the wider-field, panoramic, dimension resulting in a nominal total of 20,000,000 picture elements to represent the full panoramic scene. In addition, the term "high spatial resolution" is taken here to refer to images in which the spatial resolution is isotropic, or approximately equal in the two orthogonal dimensions of the image.

3. Real-time evaluation of the continuously collected image data alternatively by:

a) manual means, i.e., direct synoptic display of an effectively "live" television-like surveillance image to observer personnel, or by b) semi-automatic means, i.e., by real-time image-data-processing to provide automatic evaluation of the scene image-data and to alert and display to the observer personnel only at times when scene content of potential interest has been automatically detected.

The term "live" television-like is taken here to refer to a panoramic scene scanning, and display, cycle interval sufficiently short to capture all significant motions and changes that occur within the panoramic scene view. Typical cycle intervals in the present surveillance context are of the order of one second, ranging from less than one tenth of one second to tens of seconds.

A special alternative category of surveillance systems does not employ real-time evaluation. For this category, real-time recording is employed, capturing the space-time relationships in effect at the time of image collection, but deferring evaluation to a later time, and in some instances, at another location.

4. Avoiding the necessity of employing exotic or exorbitantly costly elements. This issue is particularly critical in applications requiring very-high-quality imaging performance, such as very high spatial resolution and thermal-infrared sensing.

5. Providing the superior combined features listed above while employing only a single imaging sensor and preserving a data rate comparable to a narrow-FOV type system employing a single conventional TV-type imaging sensor, without incurring the exorbitant costs associated with the conventional alternative solution involving a large number of conventional TV-type imaging sensors and the attendant immense data rate.

While the above embodiment descriptions contain many specificities, these should not be construed as limitations on the scope of the invention, but rather as exemplary embodiments thereof. Many other variations are possible. For example:

rotary-joint data link 141 may alternatively have the form of an electrically conducting rotary-joint data link, such as a form of coaxial cable in which the rotational-interfacing functions analogous to beam-containment means 146 of the electromagnetic-radiation-beam rotary-joint data link in FIG. 5 are performed by concentric contained volumes of a high-electrical-conductivity fluid, such as metallic mercury, and wherein the functions analogous to signal transmitter 145 and signal receiver 147 of FIG. 5 are performed by lengths of electrical coaxial cable;

the optical form of electromagnetic-radiation-beam rotary-joint data link 141, as described above with reference to FIG. 6, may alternatively comprise a fiber-optic rotary-joint;

rotary-joint data link 141 may alternatively have the form of an electrically conducting rotary-joint data link, such as a wideband form of electrical slip rings, or a radio-frequency transmitter and receiver or transcievers;

for the implementation alternative of employing image-collection scanning motion involving bidirectional, or oscillatory, angular motion as opposed to unidirectional angular rotation, rotary-joint data link 141 may alternatively have the form of one or more flexible electrically conducting cables.

Thus the scope of the invention should be determined by the appended claims and their legal equivalents, rather than by the examples given.

I claim:

1. A high-resolution panoramic television surveillance system having a wide-angle synoptic field of view and comprising an image-sensing station, wherein said image-sensing station comprises a) imaging-sensor means for collecting a "live" television-like synoptic panoramic surveillance image, having a line-format field of view, b) means for effecting rotation of said imaging-sensor means about an azimuthal scan-rotation axis at a predetermined angular rate whereby image data is continuously collected from a synoptic wide-angle unobstructed panoramic field, and c) image-data delivery means for continuously delivering said image data from said image-sensing station, wherein said data delivery means comprises d) rotary-joint data-transmission means for effecting data transmission between a rotatable portion of said image-sensing station and a non-rotatable portion of said image-sensing station, wherein said rotary-joint data-transmission means comprises a rotary-joint data link selected from among the group consisting of:

i) an optical-waveband electromagnetic-radiation-beam rotary-joint data link which comprises a single linear physical channel path, substantially parallel to said azimuthal scan-rotation axis of said image-sensing means and substantially coincident with said azimuthal scan-rotation axis of said image-sensing means, for transporting said image data to said non-rotatable portion and which comprises:

an optical-waveband signal transmitter and beam-forming optics mounted to said rotatable portion of said image-sensing station, said optical-waveband signal transmitter for transmitting a single optical-waveband beam of light which contains an optical-waveband signal which contains said image data and said beam-forming optics being responsive to said optical-waveband beam for propagating said optical-waveband signal; and an optical-waveband receiver comprising beam-collecting optics mounted to said non-rotatable portion of said image-sensing station for receiving said optical-waveband beam of light which contains said optical signal;

ii) an optical-fiber electromagnetic-radiation-beam rotary-joint data link which comprises a single linear physical channel path, substantially parallel to said azimuthal scan-rotation axis of said image-sensing means and substantially coincident with said azimuthal scan-rotation axis of said image-sensing means, for transporting said image data to said non-rotatable portion and which comprises a single linear optical-fiber structure comprising two co-aligned lengths of fiber-optic cable whereby:

an optical-waveband signal transmitter and said first length of fiber-optic cable coupled to said optical-waveband signal transmitter and mounted to said rotatable portion of said image-sensing station transmits a single optical-waveband beam of light which contains an optical-waveband signal which contains said image data through said first length of fiber-optic cable; and an optical-waveband receiver and said second length of fiber-optic cable optically coupled to said optical-waveband receiver and mounted to said non-rotatable portion of said image-sensing station receives said optical-waveband signal;

iii) a radio-frequency electromagnetic-radiation-beam rotary-joint data link which comprises a single linear physical channel path, substantially parallel to said azimuthal scan-rotation axis of said image-sensing means and substantially coincident with said azimuthal scan-rotation axis of said image-sensing means, for transporting said image data to said non-rotatable portion and which comprises:

a radio-frequency signal transmitter and a beam-forming antenna mounted to said rotatable portion of said image-sensing station, said radio-frequency signal transmitter transmits a single radio-frequency electromagnetic power beam which contains a radio-frequency signal which contains said image data and said beam-forming antenna being responsive to said radio-frequency electromagnetic power propagates said radio-frequency electromagnetic power; and a radio-frequency receiver comprising a beam-collecting antenna mounted to said non-rotatable portion of said image-sensing station for receiving said transmitted radio-frequency electromagnetic power beam which contains said radio-frequency signal;

iv) an electrically conducting rotary-joint data link which comprises a single linear electrical-conductor path, substantially parallel to said azimuthal scan-rotation axis of said image-sensing means and substantially coincident with said azimuthal scan-rotation axis of said image-sensing means, for transporting said image data to said non-rotatable portion and which comprises a coaxial electrical cable comprising two co-aligned lengths whereby said first length of electrical coaxial cable mounted to said rotatable portion of said image-sensing station transmits a wideband electrical signal which contains said image data; concentric contained volumes of high-electrical-conductivity fluid in electrical contact with said first length of electrical coaxial cable and responsive to said wideband electrical signal propagate said wideband electrical signal; and a second length of electrical coaxial cable mounted to said non-rotatable portion of said image-sensing station and in electrical contact with said concentric contained volumes of high-electrical-conductivity fluid receives said wideband electrical signal.

2. A high-resolution panoramic television surveillance system as claimed in claim 1, wherein the imaging-sensor means comprises an imaging sensor selected from among the group consisting of a visual-waveband imaging sensor, an infrared-waveband imaging sensor, and an ultraviolet-waveband imaging sensor.

3. A high-resolution panoramic television surveillance system as claimed in claim 1, wherein the imaging-sensor means comprises a plurality of imaging sensors.

4. A high-resolution panoramic television surveillance system as claimed in claim 1, wherein said rotary-joint data-transmission means provides simultaneous bidirectional data flow for simultaneous transmission of image data, instrumentation data regarding the status and condition of system elements mounted on the rotatable portion of said image-sensing station, and data to control the operation of system elements mounted on said rotatable portion.

5. A high-resolution panoramic television surveillance system as claimed in claim 1, wherein the imaged wide-angle field is substantially 360° in width and said rotation-effecting means provides continuous unidirectional scan rotation.

6. A high-resolution panoramic television surveillance system as claimed in claim 1, which further comprises an image-monitoring station comprising e) image-data-processing means for processing the image data into a form suitable for surveillance-evaluation display, f) display buffer-storage means for storing the image data for uninterrupted display between image collection cycles by a synoptic panoramic array of visual monitor displays, g) a synoptic panoramic array of visual monitor displays, and h) an observer-personnel position, whereby the combined operation of said image-data-processing means, said display buffer-storage means, and said synoptic panoramic array of visual monitor displays, enables continuous synoptic evaluation of the panoramic scene at said observer-personnel position.

7. A high-resolution panoramic television surveillance system as claimed in claim 6, wherein the imaging-sensor means comprises a plurality of imaging sensors, and wherein said image-monitoring station comprises a plurality of imaging-sensor channels of said image-data-processing means, said display buffer-storage means, and said synoptic panoramic arrays of visual monitor displays.

8. A high-resolution panoramic television surveillance system as claimed in claim 6, wherein said image-data-processing means further performs continuous semi-automatic detection of candidate targets from the full panoramic synoptic scene for display to said observer-personnel position by said synoptic panoramic array of visual monitor displays.

9. A high-resolution panoramic television surveillance system as claimed in claim 6, wherein said visual monitor displays are of a long-persistence type such that said long-persistence characteristic comprises said display buffer-storage means.

10. A high-resolution panoramic television surveillance system as claimed in claim 1, which further comprises an image-monitoring station comprising e) image-data-processing means for processing the image data into a form suitable for surveillance-evaluation recording, and f) an image-data recorder for continuously recording the collected image data whereby the image data can be evaluated off-line at a later time.

11. A high-resolution panoramic television surveillance system having a wide-angle synoptic field of view which is substantially 360° in width and comprising an image-sensing station and an image-monitoring station, wherein said image-sensing station comprises a) imaging-sensor means for collecting a "live" television-like synoptic panoramic surveillance image, having a line-format field of view, b) means for effecting rotation of said imaging-sensor means about an azimuthal scan-rotation axis at a predetermined angular rate whereby image data is continuously collected from a synoptic wide-angle unobstructed panoramic field which is substantially 360° in width, and c) image-data delivery means for continuously delivering said image data from said image-sensing station, wherein said data delivery means comprises d) rotary-joint data-transmission means for effecting data transmission between a rotatable portion of said image-sensing station and a non-rotatable portion of said image-sensing station, wherein said rotary-joint data-transmission means comprises a rotary-joint data link selected from among the group consisting of:

i) an optical-waveband electromagnetic-radiation-beam rotary-joint data link which comprises a single linear physical channel path, substantially parallel to said azimuthal scan-rotation axis of said image-sensing means and substantially coincident with said azimuthal scan-rotation axis of said image-sensing means, for transporting said image data to said non-rotatable portion and which comprises:

an optical-waveband signal transmitter and beam-forming optics mounted to said rotatable portion of said image-sensing station, said optical-waveband signal transmitter transmits a single optical-waveband beam of light which contains an optical-waveband signal which contains said image data and said beam-forming optics being responsive to said optical-waveband beam for propagating said optical-waveband signal; and an optical-waveband receiver comprising beam-collecting optics mounted to said non-rotatable portion of said image-sensing station receives said optical-waveband beam of light which contains said optical signal;

ii) an optical-fiber electromagnetic-radiation-beam rotary-joint data link which comprises a single linear physical channel path, substantially parallel to said azimuthal scan-rotation axis of said image-sensing means and substantially coincident with said azimuthal scan-rotation axis of said image-sensing means, for transporting said image data to said non-rotatable portion and which comprises a single linear optical-fiber structure comprising two co-aligned lengths of fiber-optic cable whereby:

an optical-waveband signal transmitter and a first said length of fiber-optic cable coupled to said optical-waveband signal transmitter and mounted to said rotatable portion of said image-sensing station transmits a single optical-waveband beam of light which contains an optical-waveband signal which contains said image data through said first length of fiber-optic cable; and an optical-waveband receiver and said second length of fiber-optic cable optically coupled to said optical-waveband receiver and mounted to said non-rotatable portion of said image-sensing station for receiving said optical-waveband signal;

iii) a radio-frequency electromagnetic-radiation-beam rotary-joint data link which comprises a single linear physical channel path, substantially parallel to said azimuthal scan-rotation axis of said image-sensing means and substantially coincident with said azimuthal scan-rotation axis of said image-sensing means, for transporting said image data to said non-rotatable portion and which comprises:

a radio-frequency signal transmitter and a beam-forming antenna mounted to said rotatable portion of said image-sensing station said radio-frequency signal transmitter transmits a single radio-frequency electromagnetic power beam which contains a radio-frequency signal which contains said image data and said beam-forming antenna being responsive to said radio-frequency electromagnetic power propagates said radio-frequency electromagnetic power; and a radio-frequency receiver comprising a beam-collecting antenna mounted to said non-rotatable portion of said image-sensing station receives said transmitted radio-frequency electromagnetic power beam which contains said radio-frequency signal;

iv) an electrically conducting rotary-joint data link which comprises a single linear electrical-conductor path substantially parallel to said azimuthal scan-rotation axis of said image-sensing means and substantially coincident with said azimuthal scan-rotation axis of said image-sensing means, for transporting said image data to said non-rotatable portion and which comprises a coaxial electrical cable comprising two lengths whereby said first length of electrical coaxial cable mounted to said rotatable portion of said image-sensing station transmits a wideband electrical signal which contains said image data; concentric contained volumes of high-electrical-conductivity fluid in electrical contact with said first length of electrical coaxial cable and responsive to said wideband electrical signal propagate said wideband electrical signal; and a second length of electrical coaxial cable mounted to said non-rotatable portion of said image-sensing station and in electrical contact with said concentric contained volumes of high-electrical-conductivity fluid receives said wideband electrical signal; and v) an electrically conducting rotary-joint data link comprising wideband electrical sliprings, and wherein said image-monitoring station comprises e) image-data-processing means for processing the image data from said entire synoptic wide-angle panoramic field which is substantially 360° in width into a form suitable for surveillance-evaluation display, f) display buffer-storage means for storing the image data from said entire synoptic wide-angle panoramic field which is substantially 360° in width for uninterrupted display between image collection cycles by a synoptic panoramic array of visual monitor displays, g) a synoptic panoramic array of visual monitor displays for displaying said entire synoptic wide-angle panoramic field which is substantially 360° in width, and h) an observer-personnel position, whereby the combined operation of said image-data-processing means, said display buffer-storage means, and said synoptic panoramic array of visual monitor displays, enables continuous synoptic evaluation of the entire synoptic wide-angle panoramic field which is substantially 360° in width at said observer-personnel position.

12. A high-resolution panoramic television surveillance system as claimed in claim 11, wherein the imaging-sensor means comprises an imaging sensor selected from among the group consisting of a visual-waveband imaging sensor, an infrared-waveband imaging sensor, and an ultraviolet-waveband imaging sensor.

13. A high-resolution panoramic television surveillance system as claimed in claim 11, wherein the imaging-sensor means comprises a plurality of imaging sensors.

14. A high-resolution panoramic television surveillance system as claimed in claim 11, wherein said rotary-joint data-transmission means comprises an electromagnetic radiation-beam rotary-joint data link.

15. A high-resolution panoramic television surveillance system as claimed in claim 11, wherein said rotary-joint data-transmission means provides simultaneous bidirectional data flow for simultaneous transmission of image data, instrumentation data regarding the status and condition of system elements mounted on the rotatable portion of said image-sensing station, and data to control the operation of system elements mounted on said rotatable portion.

16. A high-resolution panoramic television surveillance system as claimed in claim 11, wherein said rotation-effecting means provides continuous unidirectional scan rotation.

17. A high-resolution panoramic television surveillance system as claimed in claim 11, wherein the imaging-sensor means comprises a plurality of imaging sensors, and wherein said image-monitoring station comprises a plurality of imaging-sensor channels of said image-data-processing means, said display buffer-storage means, and said synoptic panoramic arrays of visual monitor displays.

18. A high-resolution panoramic television surveillance system as claimed in claim 11, wherein said image-data-processing means further performs continuous semi-automatic detection of candidate targets from the full synoptic wide-angle panoramic field which is substantially 360° in width for display to said observer-personnel position by said synoptic panoramic array of visual monitor displays.

19. A high-resolution panoramic television surveillance system as claimed in claim 11, wherein said visual monitor displays are of a long-persistence type such that said long-persistence characteristic comprises said display buffer-storage means.

20. A high-resolution panoramic television surveillance system as claimed in claim 11, wherein said image-data-processing means further comprises an image-data recorder for continuously recording the collected image data whereby the data can be evaluated off-line at a later time.

21. A method for immediately detecting the presence and location of any object of interest for surveillance evaluation, within a very wide-angle panoramic region which is substantially 360° in width, comprising the steps of:
   a) continuously collecting a "live" television-like synoptic panoramic surveillance image of said entire wide-angle panoramic region from an image-sensing station by
      1) panoramically scanning for collecting image data employing a line-format field of view, and
      2) effecting rotation of said line-format field of view about an azimuthal scan-rotation axis at a predetermined angular rate whereby image data is continuously collected from a synoptic wide-angle unobstructed panoramic field which is substantially 360° in width,
   b) continuously transmitting the collected image data from a rotatable portion of said image-sensing station to a non-rotatable portion of said image-sensing station, providing simultaneous bidirectional data flow for the simultaneous transmission of image data,
   instrumentation data regarding the status and condition of the rotatable portion of said image-sensing station, and data to control the operation of said rotatable portion,
   c) accepting the collected image data at an image-monitoring station which is continuously delivered from said non-rotatable portion of said image-sensing station,
   d) processing said image data into a form suitable for surveillance-evaluation display,
   e) buffer storing the processed image data for uninterrupted display between image collection cycles by a synoptic panoramic array of visual monitor displays, and
   f) continuously displaying the processed image data on a synoptic panoramic array of visual monitor displays at an observer-personnel position,
   thereby enabling continuous synoptic evaluation of the substantially 360° panoramic scene at said observer-personnel position.

22. A method for immediately detecting the presence and location of any object of interest for surveillance evaluation, within a very wide-angle panoramic region, as claimed in claim 21, wherein the image data is collected in at least one of the visible, infrared, and ultraviolet wavebands.

23. A method for immediately detecting the presence and location of any object of interest for surveillance evaluation, within a very wide-angle panoramic region, as claimed in claim 21, wherein said surveillance image is collected using a plurality of line-format field of view image-sensing channels.

24. A method for immediately detecting the presence and location of any object of interest for surveillance evaluation, within a very wide-angle panoramic region, as claimed in claim 21, wherein said data transmission of collected image data between a rotatable portion of said image-sensing station and a non-rotatable portion of said image-sensing station employs an electromagnetic beam.

25. A method for immediately detecting the presence and location of any object of interest for surveillance evaluation, within a very wide-angle panoramic region, as claimed in claim 21, wherein said rotation is effected by continuous unidirectional scan rotation.

26. A method for immediately detecting the presence and location of any object of interest for surveillance evaluation, within a very wide-angle panoramic region, as claimed in claim 21, wherein the image data is collected using a plurality of line-format field of view channels, and wherein said image-monitoring station provides a plurality of image-sensing channels of said image-data processing, buffer storing, and displaying.

27. A method for immediately detecting the presence and location of any object of interest for surveillance evaluation, within a very wide-angle synoptic panoramic region which is substantially 360° in width, as claimed in claim 21, wherein said step of processing said image data into a form suitable for surveillance-evaluation display further comprises performing semi-automatic detection of candidate objects, or targets, to be displayed.

28. A method for immediately detecting the presence and location of any object of interest for surveillance evaluation, within a very wide-angle panoramic region, as claimed in claim 21, wherein the step of buffer-storing said processed image data is effected by employing long-persistence type visual monitor displays in said synoptic panoramic array of visual monitor displays for displaying the processed image data with uninterrupted display between image collection cycles.

29. A method for immediately detecting the presence and location of any object of interest for surveillance evaluation, within a very wide-angle panoramic region, as claimed in claim 21, wherein said step of processing said image data further comprises the step of continuously recording the collected image data whereby the data can be evaluated off-line at a later time.

* * * * *